United States Patent
Wang et al.

(10) Patent No.: US 11,643,537 B2
(45) Date of Patent: *May 9, 2023

(54) POLYPROPYLENE BASED COMPOSITION WITH IMPROVED PAINT ABILITY

(71) Applicant: BOREALIS AG, Vienna (AT)

(72) Inventors: Jingbo Wang, Linz (AT); Friedrich Berger, Linz (AT); Daniela Mileva, Linz (AT); Georg Grestenberger, Linz (AT); Markus Gahleitner, Linz (AT)

(73) Assignee: BOREALIS AG, Vienna (AT)

( * ) Notice: Subject to any disclaimer, the term of this patent is extended or adjusted under 35 U.S.C. 154(b) by 136 days.

This patent is subject to a terminal disclaimer.

(21) Appl. No.: 17/269,217

(22) PCT Filed: Aug. 23, 2019

(86) PCT No.: PCT/EP2019/072558
§ 371 (c)(1),
(2) Date: Feb. 17, 2021

(87) PCT Pub. No.: WO2020/048793
PCT Pub. Date: Mar. 12, 2020

(65) Prior Publication Data
US 2021/0253838 A1    Aug. 19, 2021

(30) Foreign Application Priority Data

Sep. 6, 2018  (EP) ..................... 8193002

(51) Int. Cl.
C08L 23/08    (2006.01)
C08L 23/20    (2006.01)
C08L 23/12    (2006.01)
C08K 3/013    (2018.01)

(52) U.S. Cl.
CPC .......... *C08L 23/12* (2013.01); *C08F 2500/34* (2021.01); *C08K 3/013* (2018.01); *C08L 23/0815* (2013.01); *C08L 23/20* (2013.01); *C08L 2205/035* (2013.01); *C08L 2207/02* (2013.01); *C08L 2308/00* (2013.01)

(58) Field of Classification Search
None
See application file for complete search history.

(56) References Cited

FOREIGN PATENT DOCUMENTS

| CN | 107735446 A | 2/2018 |
|---|---|---|
| EP | 0887379 A1 | 12/1998 |
| EP | 2495264 A1 | 9/2012 |
| EP | 02610270 A1 | 7/2013 |
| EP | 02610271 A1 | 7/2013 |
| EP | 02610272 A1 | 7/2013 |
| EP | 2781548 A1 | 9/2014 |
| EP | 3115412 A1 | 1/2017 |
| EP | 3357964 A1 | 8/2018 |
| WO | 1992/012182 A1 | 7/1992 |
| WO | 1999/024478 A1 | 5/1999 |
| WO | 1999/024479 A1 | 5/1999 |
| WO | 2000/068315 A1 | 11/2000 |
| WO | 2003/000754 A1 | 1/2003 |
| WO | 2003/000757 A1 | 1/2003 |
| WO | 2004/000899 A1 | 12/2003 |
| WO | 2004/029112 A1 | 4/2004 |
| WO | 2004/111095 A1 | 12/2004 |
| WO | 2007/137853 A1 | 12/2007 |
| WO | 2012/007430 A1 | 1/2012 |
| WO | 2014/191211 A1 | 12/2014 |
| WO | 2015/082402 A1 | 6/2015 |
| WO | 2015/082403 A1 | 6/2015 |
| WO | 2015089688 A1 | 6/2015 |

OTHER PUBLICATIONS

Busico, V., Cipullo, R., Prog. Polym. Sci. 26 (2001) 443.
Busico, V., Cipullo, R., Monaco, G., Vacatello, M., Segre, A.L., Macromolecules 30 (1997) 6251. Busico, V., Carbonniere, P., Cipullo, R., Pellecchia, R., Severn, J., Talarico, G., Macromol. Rapid Commun. 2007, 28, 1128.
Castignolles, P., Graf, R., Parkinson, M., Wilhelm, M., Gaborieau, M., Polymer 50 (2009) 2373.
Resconi, L., Cavallo, L., Fait, A., Piemontesi, F., Chem. Rev. 2000, 100, 1253.
Cheng, H. N., Macromolecules 17 (1984), 1950.
Filip, X., Tripon, C., Filip, C., J. Mag. Resn. 2005, 176, 239.
Griffin, J.M., Tripon, C., Samoson, A., Filip, C., and Brown, S.P., Mag. Res. in Chem. 2007 45, S1, S198.
Kakugo, M., Naito, Y., Mizunuma, K., Miyatake, T. Macromolecules 15 (1982) 1150.
Klimke, K., Parkinson, M., Piel, C., Kaminsky, W., Spiess, H.W., Wilhelm, M., Macromol. Chem. Phys. 2006;207:382.
Pollard, M., Klimke, K., Graf, R., Spiess, H.W., Wilhelm, M., Sperber, O., Piel, C., Kaminsky, W., Macromolecules 2004;37:813.

(Continued)

*Primary Examiner* — Richard A Huhn
(74) *Attorney, Agent, or Firm* — Tarolli, Sundheim, Covell & Tummino LLP

(57) ABSTRACT

The present invention relates to a polypropylene based composition comprising: (A) from 40.0 to 85.0 wt % of a heterophasic propylene copolymer having a content of xylene cold soluble (XCS) fraction in the range of 15 wt % to 35 wt %, based on the total weight of the heterophasic propylene copolymer; (B) from 5.0 to 15.0 wt % of a terpolymer of propylene with ethylene and 1-butene comonomer units having a melting temperature Tm as measured in differential scanning calorimetry (DSC) of less than 140° C.; (C) from 5.0 to 25.0 wt % of an ethylene copolymer with alpha-olefin comonomer units having from 4 to 12 carbon atoms with a density of from 850 kg/m³ to 900 kg/m³; and (D) from 5.0 to 25.0 wt % of an inorganic filler, wherein the amounts of components (A), (B), (C), and (D) are all based on the total weight amount of the polypropylene based composition, said polypropylene based composition having a melt flow rate (MFR2) as measured at 230° C. and 2.16 kg load in accordance with ISO 1133 in the range of 2.0 g/10 min to 20 g/10 min, an article comprising said polypropylene based composition and the use of said terpolymer (B) for reducing the paint adhesion failure of an article comprising said polypropylene based composition.

14 Claims, No Drawings

(56) References Cited

OTHER PUBLICATIONS

Randall, J. Macromol. Sci., Rev. Macromol. Chem. Phys. 1989, C29, 201.
Singh, G., Kothari, A., Gupta, V., Polymer Testing 28 5 (2009), 475.
Wang, W-J., Zhu, S., Macromolecules 33 (2000), 1157.
Zhou, Z., Kuemmerle, R., Qiu, X., Redwine, D., Cong, R., Taha, A., Baugh, D. Winniford, B., J. Mag. Reson. 187 (2007) 225.
Parkinson, M., Klimke, K., Spiess, H.W., Wilhelm, M., Macromol. Chem. Phys. 2007;208:2128.
Hans Zweifel, Plastic Additives Handbook, 6th edition, 2009, pp. 1141-1190.
Liu, W., Rinaldi, P., McIntosh, L., Quirk, P., Macromolecules 2001, 34, 4757.
NMR Spectroscopy chapter 24.
Qiu, X., Redwine, D., Gobbi, G., Nuamthanom, A., Rinaldi, P., Macromolecules 2007, 40, 6879.
Applicant: Borealis AG; "Polypropylene Based Composition with Improved Paintability"; Korean Patent Application No. 10-2021-7004502; Notice of Allowance; dated Dec. 1, 2022; 4 pgs.
Applicant: Borealis AG; European Application No. 18193004.1; Extended European Search Report dated Feb. 27, 2019; 5 pgs.
Applicant: Borealis AG; "Polypropylene Based Composition with Improved Paintability"; Chinese Application No. 201980053658.X; Chinese Office Action dated Dec. 8, 2022; 11 pgs.
Fangming Zhu, et al.; "Copolymerization of Ethylene and Propene With Monotitanocene/Methylaluminoxane as Catalyst"; Institute of Polymer Science; No. 3; Jun. 2005; 4 pgs.
Rungswang, W., et al.; "Phase-separation of heterophasic polymer in solution: A model case of impact-resistant polypropylene copolymer"; Journal of Applied Polymer Science, 134(28), Mar. 3, 2017; 9 pgs.; doi:10.1002/app.45069.

POLYPROPYLENE BASED COMPOSITION WITH IMPROVED PAINT ABILITY

The present invention relates to a polypropylene based composition comprising a terpolymer of propylene with ethylene and 1-butene comonomer units, an article comprising said propylene based composition and the use of said terpolymer in said composition for reducing the paint adhesion failure of said article.

BACKGROUND ART

In the field of automotive applications, polyolefins such as polypropylenes are the material of choice as they can be tailored to specific purposes needed. For instance, heterophasic polypropylenes are widely used in the automobile industry, for instance in bumper applications, as they combine good stiffness with reasonable impact strength. However, the surface of molded articles obtained from heterophasic polypropylene composition is rather smooth and has a low polarity resulting in unfavourable prerequisites for interactions with a coating material. Thus, for demanding applications like automotive parts a pre-treatment as well as the application of adhesion promoters (so called primers) is typically required to ensure proper paint adhesion. Due to environmental and economic reasons it is desired to reduce the use of primers to a minimum, preferably to avoid the use of primers entirely.

Several different attempts were made to improve the paint adhesion of primerless polypropylene compositions.

WO 2014/191211 discloses a primerless polypropylene composition having a defined combination of a heterophasic propylene copolymer, a propylene homopolymer and a mineral filler.

WO 2015/082403 discloses a primerless polypropylene composition having a defined combination of a propylene copolymer, a heterophasic propylene copolymer with a xylene cold soluble fraction having an intrinsic viscosity iV of more than 2.1 dl/g, and a mineral filler.

WO 2015/082402 discloses a primerless polypropylene composition having a defined combination of a propylene copolymer and a mineral filler.

EP 2 495 264 A1 discloses a primerless polypropylene composition comprising a heterophasic propylene copolymer with a certain amount of regiodefects and a mineral filler.

Although these polypropylene compositions show improved paint adhesion the measures to improve said property often have a detrimental effect on the mechanical properties, especially on the impact strength necessary for automotive applications.

Thus, there is still a need in the art for a primerless polypropylene based composition with an improved of properties including a good paint adhesion, good mechanical properties, such as good impact strength and flexural modulus, and low shrinkage of the article made from the polypropylene based composition.

In the present invention it has been found that a polypropylene based composition having a defined combination of a heterophasic propylene copolymer, a terpolymer of propylene with ethylene and 1-butene comonomer units, an ethylene copolymer and an inorganic filler shows an improved balance of properties of good paint adhesion with a low average paint adhesion failure, good mechanical properties, with a high Charpy notched impact strength both at 23° C. and −20° C. and a high flexural modulus, and low shrinkage of the article made from the polypropylene based composition.

SUMMARY OF THE INVENTION

The present invention relates to a polypropylene based composition comprising:
(A) from 40.0 to 85.0 wt % of a heterophasic propylene copolymer having a content of xylene cold soluble (XCS) fraction in the range of 15 wt % to 35 wt %, based on the total weight of the heterophasic propylene copolymer;
(B) from 5.0 to 15.0 wt % of a terpolymer of propylene with ethylene and 1-butene comonomer units having a melting temperature Tm as measured in differential scanning calorimetry (DSC) of less than 140° C.;
(C) from 5.0 to 25.0 wt % of an ethylene copolymer with alpha-olefin comonomer units having from 4 to 12 carbon atoms with a density of from 850 kg/m$^3$ to 900 kg/m$^3$; and
(D) from 5.0 to 25.0 wt % of an inorganic filler,
wherein the amounts of components (A), (B), (C), and (D) are all based on the total weight amount of the polypropylene based composition,
said polypropylene based composition having a melt flow rate (MFR$_2$) as measured at 230° C. and 2.16 kg load in accordance with ISO 1133 in the range of 2.0 g/10 min to 20 g/10 min.

It has surprisingly been found that such polypropylene based compositions show an improved balance of properties of good paint adhesion with a low average paint adhesion failure, good mechanical properties, with a high Charpy notched impact strength both at 23° C. and −20° C. and a high flexural modulus, and low shrinkage of the article made from the polypropylene based composition.

Further, the present invention relates to an article comprising the polypropylene based composition as defined above or below.

Still further, the present invention relates to the use of a terpolymer of propylene with ethylene and 1-butene comonomer units in a polypropylene based composition comprising
(A) from 40.0 to 85.0 wt % of a heterophasic propylene copolymer having a content of xylene cold soluble (XCS) fraction in the range of 15 wt % to 35 wt %, based on the total weight of the heterophasic propylene copolymer;
(B) from 5.0 to 15.0 wt % of a terpolymer of propylene with ethylene and 1-butene comonomer units having a melting temperature Tm as measured in differential scanning calorimetry (DSC) of less than 140° C.;
(C) from 5.0 to 25.0 wt % of an ethylene copolymer with alpha-olefin comonomer units having from 4 to 12 carbon atoms with a density of from 850 kg/m$^3$ to 900 kg/m$^3$; and
(D) from 5.0 to 25.0 wt % of an inorganic filler;
wherein the amounts of components (A), (B), (C), and (D) are all based on the total weight amount of the polypropylene based composition,
said polypropylene based composition having a melt flow rate (MFR$_2$) as measured at 230° C. and 2.16 kg load in accordance with ISO 1133 in the range of 2.0 g/10 min to 20 g/10 min,
for reducing the paint adhesion failure of an article comprising said polypropylene based composition.

Thereby, the polypropylene based composition preferably relates to the polypropylene based composition as defined above or below.

It further relates to a painted article comprising said composition, for example an automotive construction element like a bumper or a body panel.

Definitions

A terpolymer of propylene is a polymer with a majority of weight amount of propylene monomer units and two different comonomer units. In the present case these two different comonomer units are ethylene comonomer units and 1-butene comonomer units. The comonomer units can be distributed in the polymer chain in blocks or randomly.

A propylene random terpolymer is a specific form of a propylene random copolymer in which two different comonomer units, such as e.g. ethylene and 1-butene comonomer units, are distributed randomly over the polypropylene chain.

A heterophasic propylene copolymer is a propylene-based copolymer with a crystalline matrix phase, which can be a propylene homopolymer or a random copolymer of propylene and at least one alpha-olefin comonomer, and an elastomeric phase dispersed therein. The elastomeric phase can be a propylene copolymer with a high amount of comonomer which is not randomly distributed in the polymer chain but are distributed in a comonomer-rich block structure and a propylene-rich block structure.

A heterophasic propylene copolymer usually differentiates from a one-phasic propylene copolymer in that it shows two distinct glass transition temperatures Tg which are attributed to the matrix phase and the elastomeric phase.

A propylene homopolymer is a polymer which essentially consists of propylene monomer units. Due to impurities especially during commercial polymerization processes a propylene homopolymer can comprise less than 0.1 wt % comonomer units, preferably up to 0.05 wt % comonomer units and most preferably up to 0.01 wt % comonomer units.

A propylene random copolymer is a copolymer of propylene monomer units and comonomer units, preferably selected from ethylene and C4-C12 alpha-olefins, in which the comonomer units are distributed randomly over the polymeric chain. The propylene random copolymer can comprise comonomer units from one or more comonomers different in their amounts of carbon atoms.

A plastomer is a polymer which combines the qualities of elastomers and plastics, such as rubber-like properties with the processing abilities of plastic.

An ethylene-based plastomer is a plastomer with a molar majority of ethylene monomer units.

A polypropylene based composition means that the majority of the weight amount of the polypropylene based composition results from propylene homo- or copolymers. In the following, amounts are given as % by weight (wt %) unless it is stated otherwise.

DETAILED DESCRIPTION

In the following the individual components are defined in more detail.

The polypropylene based composition of the present inventions comprises
(A) a heterophasic propylene copolymer;
(B) a terpolymer of propylene with ethylene and 1-butene comonomer units;
(C) an ethylene copolymer with alpha-olefin comonomer units having from 4 to 12 carbon atoms; and
(D) an inorganic filler.

Heterophasic Propylene Copolymer (A)

The heterophasic propylene copolymer (A) preferably comprises, more preferably consists of a matrix phase and an elastomeric phases dispersed therein. The matrix phase and the elastomeric phase are preferably polymerized using the same polymerization catalyst.

The matrix phase can be a propylene homopolymer or a random copolymer of propylene and comonomer units selected from ethylene and alpha-olefins having from 4 to 12 carbon atoms.

According to one preferred embodiment, the matrix phase is a random copolymer of propylene and comonomer units selected from ethylene and alpha-olefins having from 4 to 12 carbon atoms, more preferably a random copolymer of propylene and ethylene.

The matrix phase preferably has a low amount of comonomer units of from 0.01 wt % to 1.5 wt %, more preferably of from 0.02 wt % to 0.8 wt %, and most preferably of from 0.05 wt % to 0.4 wt %, based on the weight total amount of the matrix phase of the heterophasic propylene copolymer (A).

The comonomer units of the heterophasic propylene copolymer (A) can be selected from one or more than one comonomer units selected from ethylene and alpha-olefins with 4 to 12 carbon atoms.

According to another preferred embodiment, the matrix phase is a propylene homopolymer comprising only monomer units derived from propylene.

Thereby, the elastomeric phase can include the same comonomer units as the matrix phase or can include different comonomer units as the matrix phase.

It is preferred that the comonomer units of the base resin are selected from one sort of comonomer units. As a consequence the comonomer units of the matrix phase and the elastomeric phase are the same.

In a preferred embodiment the matrix phase and the elastomeric phase only include propylene monomer units and ethylene comonomer units.

In a heterophasic propylene copolymer the matrix phase and the elastomeric phase usually cannot exactly be divided from each other. In order to characterize the matrix phase and the elastomeric phase of a heterophasic propylene copolymer several methods are known. One method is the extraction of a fraction which contains to the most part the elastomeric phase with xylene, thus separating a xylene cold solubles (XCS) fraction from a xylene cold insoluble (XCI) fraction. The XCS fraction contains for the most part the elastomeric phase and only a small part of the matrix phase whereas the XCI fraction contains for the most part the matrix phase and only a small part of the elastomeric phase. The xylene extraction is especially suitable for heterophasic propylene copolymers with a highly crystalline matrix phase such as propylene homopolymer matrix phase or propylene random copolymer matrix phase with a low comonomer content of not more than about 3 wt %.

The heterophasic propylene copolymer (A) has an amount of XCS fraction of from 15 wt % to 35 wt %, preferably from 18 wt % to 32 wt %, and most preferably from 20 wt % to 30 wt %, based on the total amount of the heterophasic propylene copolymer (A).

Preferably the XCS fraction has a comonomer content of from 25 wt % to 55 wt %, more preferably from 28 wt % to 50 wt % and most preferably from 30 wt % to 45 wt %, based on the total amount of monomer units in the XCS phase.

Thereby, the remaining amount of monomer units of the XCS fraction making up to 100 wt % is the amount of propylene monomer units.

The comonomer units of the XCS fraction are preferably selected from one or more comonomer units selected from ethylene and alpha-olefins with 4 to 12 carbon atoms, more preferably the comonomer units are selected from ethylene, 1-butene, 1-hexene and 1-octene.

It is preferred that the XCS phase only contains one sort of comonomer units as defined above.

In an especially preferred embodiment, the comonomer units of then XCS fraction are ethylene comonomer units.

Further, the XCS fraction preferably has an intrinsic viscosity iV as measured in decalin at 135° C. of from 2.0 dl/g to 6.0 dl/g, more preferably from 2.5 dl/g to 5.5 dl/g, and most preferably from 3.5 dug to 5.0 dl/g.

The XCI fraction is preferably present in the heterophasic propylene copolymer (A) in an amount of from 65 wt % to 85 wt %, more preferably from 68 wt % to 82 wt % and most preferably from 70 wt % to 80 wt %, based on the total amount of the heterophasic propylene copolymer (A).

Preferably the XCI fraction has a comonomer content of from 0.01 wt % to 5.0 wt %, more preferably of from 0.02 wt % to 3.0 wt %, and most preferably of from 0.05 wt % to 2.0 wt %, based on the total amount of monomer units in the XCI fraction.

Thereby, the remaining amount of monomer units of the XCI fraction making up to 100 wt % is the amount of propylene monomer units.

The comonomer units of the XCI fraction are preferably selected from one or more comonomer units selected from ethylene and alpha-olefins with 4 to 12 carbon atoms, more preferably the comonomer units are selected from ethylene, 1-butene, 1-hexene and 1-octene.

It is preferred that the XCI fraction only contains one sort of comonomer units as defined above.

In an especially preferred embodiment, the comonomer units of then XCI fraction are ethylene comonomer units.

The heterophasic propylene copolymer (A) preferably has a melt flow rate MFR (230° C., 2.16 kg) of from 10.0 g/10 min to 100 g/10 min, more preferably of from 12.0 g/10 min to 80.0 g/10 min, and most preferably of from 14.0 g/10 min to 70.0 g/10 min.

The total amount of comonomer units, preferably ethylene units, in the heterophasic propylene copolymer (A) is preferably in the range of from 4.0 wt % to 20.0 wt %, more preferably of from 5.0 wt % to 15.0 wt %, and most preferably of from 6.0 wt % to 12.0 wt %, based on the total weight of the heterophasic propylene copolymer (A).

The heterophasic propylene copolymer (A) is preferably the major component of the polypropylene based composition.

The heterophasic propylene copolymer (A) is present in the polypropylene based composition in an amount of from 40.0 wt % to 85.0 wt %, preferably of from 45.0 wt % to 80.0 wt %, more preferably of from 50.0 wt % to 75.0 wt % and most preferably of from 52.0 wt % to 70.0 wt %, based on the total weight amount of the polypropylene based composition.

Preferably, the matrix phase of the polymer base resin is polymerized prior to the elastomeric phase of the heterophasic propylene copolymer (A).

The propylene homo- or copolymer of the matrix phase can be polymerized in one polymerization reactor or in more than one, such as two, polymerization reactors. The propylene copolymer of the elastomeric phase can be polymerized in one polymerization reactor or in more than one, such as two, polymerization reactors.

In a preferred embodiment, the propylene homo- or copolymer of the matrix phase is polymerized in two polymerization reactors and the propylene copolymer of the elastomeric phase can be polymerized in one polymerization reactor, which are preferably connected in series.

It is well understood by a person skilled in the art that the propylene homo- or copolymer reflecting the matrix phase is usually not identical to the XCI phase and that the propylene copolymer reflecting the elastomeric phase is usually not identical to the XCS phase.

The propylene homo- or copolymer of the matrix phase can be polymerized in a single polymerization reactor. In said embodiment the matrix phase is a unimodal propylene homo- or copolymer.

The propylene homo- or copolymer of the matrix phase can be polymerized in two or more polymerization reactors, such as 2, 3 or 4 polymerization reactors, most preferably 2 polymerization reactors, connected in series.

This means that in a first polymerization reactor a first part of the propylene homo- or copolymer of the matrix phase is polymerized in the presence of a polymerization catalyst to produce a first part of a first polymerization mixture comprising a first part of the propylene homo- or copolymer and the catalyst, transferring the first part of the first polymerization mixture into a second polymerization reactor and polymerizing a second part of the propylene homo- or copolymer of the matrix phase in the presence of the polymerization catalyst in the presence of said first part of the propylene homo- or copolymer to produce a second part of the first polymerization mixture comprising the first and second part of the propylene homo- or copolymer of the matrix phase and the catalyst.

These process steps can be repeated further in one or more additional subsequent polymerization reactor(s).

The polymerization conditions in the first, second and optionally subsequent polymerization reactor(s) of process step a) can be comparable. In said embodiment the matrix phase is a unimodal propylene homo- or copolymer.

Alternatively, the polymerization conditions in the first, second and optionally subsequent polymerization reactor(s) of process step a) can be different from each other, especially in one or more of polymerization temperature, polymerization pressure, comonomer feed or chain transfer agent feed. In said embodiment the matrix phase is a multimodal propylene homo- or copolymer. In the case of two polymerization reactors in series of said embodiment the matrix phase is a bimodal propylene homo- or copolymer.

In said embodiment, it is possible to polymerize a propylene homopolymer in one or more of the polymerization reactors and a propylene random copolymer in one or more of the polymerization reactors. In said embodiment the matrix phase is a multimodal propylene copolymer comprising a propylene homopolymer fraction and a propylene random copolymer fraction. It is especially preferred that a propylene homopolymer is polymerized in one polymerization reactor and a propylene random copolymer is polymerized in the other polymerization reactor of a two reactor sequence to polymerize a matrix phase with one propylene homopolymer fraction and one propylene random copolymer fraction.

There is no special preference in the sequence of the polymerization of the fractions of the matrix phase.

Preferably, the elastomeric phase of the heterophasic propylene copolymer (A) is polymerized after and in the presence of the matrix phase of the heterophasic propylene copolymer (A).

The propylene copolymer of the elastomeric phase can be polymerized in a single polymerization reactor. In said embodiment the elastomeric phase is a unimodal propylene copolymer.

The propylene copolymer of the elastomeric phase can also be polymerized in two or more polymerization reactors, such as 2, 3 or 4 polymerization reactors, most preferably 2 polymerization reactors, connected in series.

This means that in a first polymerization reactor a first part of the propylene copolymer of the elastomeric phase is polymerized in the presence of a polymerization catalyst to produce a first part of a second polymerization mixture comprising a first part of the propylene copolymer of the elastomeric phase, the propylene homo- or copolymer of the matrix phase and the catalyst, transferring the first part of the second polymerization mixture into a second polymerization reactor and polymerizing a second part of the propylene copolymer of the elastomeric phase in the presence of the polymerization catalyst in the presence of said first part of the propylene copolymer to produce a second part of the second polymerization mixture comprising the first and second part of the propylene copolymer of the elastomeric phase, the propylene homo- or copolymer of the matrix phase and the catalyst. These process steps can be repeated further in one or more additional subsequent polymerization reactor(s).

The polymerization conditions in the first, second and optionally subsequent polymerization reactor(s) can be comparable. In said embodiment the elastomeric phase is a unimodal propylene copolymer.

Alternatively, the polymerization conditions in the first, second and optionally subsequent polymerization reactor(s) can be different from each other, especially in one or more of polymerization temperature, polymerization pressure, comonomer feed or chain transfer agent feed. In said embodiment the elastomeric phase is a multimodal propylene copolymer. In the case of two polymerization reactors in series of said embodiment the elastomeric phase is a bimodal propylene copolymer. In said embodiment, it is possible to polymerize propylene copolymers with different comonomers in the two or more of the polymerization reactors. In said embodiment the elastomeric phase is a multimodal propylene copolymer comprising a propylene copolymer fraction with one comonomer and a propylene copolymer fraction with another comonomer.

There is no special preference in the sequence of the polymerization of the fractions of the elastomeric phase.

Preferably, the first polymerization reactor is operating in bulk, such as a loop reactor and all subsequent polymerization reactors, preferably including the optional second and subsequent polymerization reactor(s) of process step a), are operating in gas phase.

It is preferred that the polymerization steps of the process of the present invention are carried out in a bulk polymerization reactor, preferably a loop reactor, followed by one or more, such as 1, 2, 3 or 4, preferably 1 or 2 gas phase reactors, connected in series.

The first polymerization step can also be preceded by a prepolymerization step. In said embodiment it is preferred that the polymerization steps of the process of the present invention are carried out in a prepolymerization reactor, followed by a bulk polymerization reactor, preferably a loop reactor, followed by one or more, such as 1, 2, 3 or 4, preferably 1 or 2 gas phase reactors, connected in series.

The polymerization conditions, such as polymerization temperature, polymerization pressure, propylene feed, comonomer feed, chain transfer agent feed or residence time of the different polymerization steps are not particularly limited. It is well known to a person skilled in the art how to adjust these polymerization conditions in order to adjust the properties of the propylene homo- or copolymer of the matrix phase and the propylene copolymer of the elastomeric phase.

The residence time in the polymerization reactors are preferably selected as such that the weight ratio of the propylene homo- or copolymer of the matrix phase to the propylene copolymer of the elastomeric phase is in the range of from 65:35 to 85:15.

Suitably the polymerization steps of the process of the present invention is conducted in a "loop-gas phase"-process, such as developed by Borealis and known as BORSTAR™ technology. Examples of this process are described in EP 0 887 379, WO 92/12182, WO 2004/000899, WO 2004/111095, WO 99/24478, WO 99/24479 and WO 00/68315. These patent applications also describe suitable polymerization conditions. Another suitable process is the slurry-gas phase process called Spheripol™ process.

Generally, a polymerization catalyst is present in the process according to the invention. The polymerization catalyst is preferably a Ziegler-Natta catalyst. Generally, the polymerization Ziegler-Natta catalyst comprises one or more compounds of a transition metal (TM) of Group 4 to 6 as defined in IUPAC version 2013, like titanium, further a Group 2 metal compound, like a magnesium compound and an internal donor (ID).

The components of the catalyst may be supported on a particulate support, such as for example an inorganic oxide, like for example silica or alumina. Alternatively, a magnesium halide may form the solid support. It is also possible that the catalyst components are not supported on an external support, but the catalyst is prepared by an emulsion-solidification method or by a precipitation method, as is well-known by the man skilled in the art of catalyst preparation.

Preferably, a specific type of Ziegler-Natta catalyst is present in the process according to the invention. In this specific type of Ziegler-Natta catalyst, it is essential that the internal donor is a non-phthalic compound. Preferably, through the whole specific type of Ziegler-Natta catalyst preparation no phthalate compound is used, thus the final specific type of Ziegler-Natta catalyst does not contain any phthalic compound. Thus, the specific type of Ziegler-Natta catalyst is free of phthalic compound. Therefore, the polypropylene composition obtained in the third reactor of the process according to the invention is free of phthalic compound. Generally, the specific type of Ziegler-Natta catalyst comprises an internal donor (ID) which is chosen to be a non-phthalic compound, in this way the specific type of Ziegler-Natta catalyst is completely free of phthalic compound. Further, the specific type of Ziegler-Natta catalyst can be a solid catalyst preferably being free of any external support material, like silica or $MgCl_2$, and thus the solid catalyst is self-supported.

The solid catalyst is obtainable by the following general procedure:
a) providing a solution of
   $a_1$) at least a Group 2 metal alkoxy compound (Ax) being the reaction product of a Group 2 metal compound and an alcohol (A) comprising in addition to the hydroxyl moiety at least one ether moiety, optionally in an organic liquid reaction medium; or a$_2$) at least a Group 2 metal alkoxy compound (Ax') being the reaction product of a Group 2 metal compound and an alcohol mixture of the alcohol (A) and a monohydric alcohol (B) of formula ROH, optionally in an organic liquid reaction medium; or a$_3$) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or a$_4$) Group 2 metal alkoxy compound of formula M(OR$_1$)$_n$(OR$_2$)$_m$X$_{2-n-m}$ or mixture of Group 2 alkoxides M(OR$_1$)$_n$X$_{2-n'}$ and M(OR$_2$)$_m$X$_{2-m'}$, where M is a Group 2 metal, X is halogen, R$_1$ and R$_2$ are different alkyl groups of 2 to 16 carbon atoms, and 0≤n<2, 0≤m<2 and n+m+(2−n−m)=2, provided that n and m are not 0 simultaneously, 0<n'≤2 and 0<m'≤2; and b) adding said solution from step a) to at least one compound of a transition metal of Group 4 to 6 and c) obtaining the solid catalyst component particles, and adding a non-phthalic internal electron donor (ID) at least in one step prior to step c).

The internal donor (ID) or precursor thereof is preferably added to the solution of step a) or to the transition metal compound before adding the solution of step a). According to the procedure above, the solid catalyst can be obtained via a precipitation method or via an emulsion-solidification method depending on the physical conditions, especially the temperature used in steps b) and c). An emulsion is also called liquid-liquid two-phase system. In both methods (precipitation or emulsion-solidification) the catalyst chemistry is the same.

In the precipitation method, combination of the solution of step a) with at least one transition metal compound in step b) is carried out and the whole reaction mixture is kept at least at 50° C., more preferably in a temperature range of 55 to 110° C., more preferably in a range of 70 to 100° C., to secure full precipitation of the catalyst component in the form of solid catalyst component particles (step c).

In the emulsion-solidification method, in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C. The catalyst prepared by the emulsion-solidification method is preferably used in the present invention.

In step a) preferably the solution of a$_2$) or a$_3$) is used, i.e. a solution of (Ax') or a solution of a mixture of (Ax) and (Bx).

Preferably, the Group 2 metal is magnesium. The magnesium alkoxy compounds (Ax), (Ax'), (Bx) can be prepared in situ in the first step of the catalyst preparation process, step a), by reacting the magnesium compound with the alcohol(s) as described above. Another option is to prepare said magnesium alkoxy compounds separately or they can be even commercially available as already prepared magnesium alkoxy compounds and used as such in the catalyst preparation process of the invention.

Illustrative examples of alcohols (A) are glycol monoethers. Preferred alcohols (A) are C$_2$ to C$_4$ glycol monoethers, wherein the ether moieties comprise from 2 to 18 carbon atoms, preferably from 4 to 12 carbon atoms. Preferred examples are 2-(2-ethylhexyloxy) ethanol, 2-butyloxy ethanol, 2-hexyloxy ethanol and 1,3-propylene-glycol-monobutyl ether, 3-butoxy-2-propanol, with 2-(2-ethylhexyloxy) ethanol and 1,3-propylene-glycol-monobutyl ether, 3-butoxy-2-propanol being particularly preferred.

The illustrative monohydric alcohol (B) is represented by the structural formula ROH with R being a straight-chain or branched C$_2$-C$_{16}$ alkyl residue, preferably a C$_4$ to C$_{10}$ alkyl residue, more preferably a C$_6$ to C$_8$ alkyl residue. The most preferred monohydric alcohol is 2-ethyl-1-hexanol or octanol.

Preferably, a mixture of Mg alkoxy compounds (Ax) and (Bx) or a mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

The magnesium alkoxy compound may be a reaction product of alcohol(s), as defined above and a magnesium compound selected from dialkyl magnesium, alkyl magnesium alkoxide, magnesium dialkoxide, alkoxy magnesium halide and alkyl magnesium halide. Further, magnesium dialkoxide, magnesium diaryloxide, magnesium aryloxyhalide, magnesium aryloxide and magnesium alkyl aryloxide can be used. Alkyl groups in the magnesium compound can be similar or different C$_1$-C$_{20}$ alkyl groups, preferably C$_2$-C$_{10}$ alkyl groups. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred, dialkyl magnesiums are butyl octyl magnesium or butyl ethyl magnesium.

It is also possible that the magnesium compound reacts in addition to the alcohol (A) and alcohol (B) with a polyhydric alcohol (C) of formula R"(OH)$_m$ to obtain said magnesium alkoxide compound. Preferred polyhydric alcohols, if used, are alcohols, wherein R" is a straight-chain, cyclic or branched C$_2$ to C$_{10}$ hydrocarbon residue and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides or a mixture of magnesium dihalide and a magnesium dialkoxide.

The solvent to be employed for the preparation of the present catalyst may be selected from among aromatic and aliphatic straight-chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particularly preferred.

The reaction for the preparation of the magnesium alkoxy compound may be carried out at a temperature of 40 to 70° C. The man skilled in the art knows how to select the most suitable temperature depending on the Mg compound and alcohol(s) used.

The transition metal (TM) compound of Group 4 to 6 as defined in IUPAC version 2013 is preferably a titanium compound, most preferably a titanium halide, like TiCl$_4$.

The non-phthalic internal donor (ID) used in the preparation of the specific type of Ziegler-Natta catalyst used in the present invention is preferably selected from (di)esters of non-phthalic carboxylic (di)acids, 1,3-diethers, derivatives and mixtures thereof. An especially preferred donor is a diester of mono-unsaturated non-phthalic dicarboxylic acids, in particular an ester belonging to a group comprising malonates, maleates, succinates, citraconates, glutarates, cyclohexene-1,2-dicarboxylates and benzoates and derivatives thereof and/or mixtures thereof. Preferred examples are e.g. substituted maleates and citraconates, most preferably citraconates.

Here and hereinafter the term derivative includes substituted compounds.

In the emulsion-solidification method, the two phase liquid-liquid system may be formed by simple stirring and optionally adding (further) solvent(s) and/or additives, such as a turbulence minimizing agent (TMA) and/or an emulsifying agent and/or an emulsion stabilizer, like a surfactant, which are used in a manner known in the art. These solvents and/or additives are used to facilitate the formation of the emulsion and/or stabilize it. Preferably, surfactants are acrylic or methacrylic polymers. Particularly preferred are unbranched $C_{12}$ to $C_{20}$ (meth)acrylates such as for example poly(hexadecyl)-methacrylate and poly(octadecyl)-methacrylate and mixtures thereof. The turbulence minimizing agent (TMA), if used, is preferably selected from polymers of α-olefin monomers with 6 to 20 carbon atoms, like polyoctene, polynonene, polydecene, polyundecene or polydodecene or mixtures thereof. Most preferable it is polydecene.

The solid particulate product obtained by the precipitation or emulsion-solidification method may be washed at least once, preferably at least twice, most preferably at least three times. The washing can take place with an aromatic and/or aliphatic hydrocarbon, preferably with toluene, heptane or pentane. Washing is also possible with $TiCl_4$ optionally combined with the aromatic and/or aliphatic hydrocarbon. Washing liquids can also contain donors and/or compounds of Group 13, like trialkyl aluminium, halogenated alky aluminium compounds or alkoxy aluminium compounds. Aluminium compounds can also be added during the catalyst synthesis. The catalyst can further be dried, for example by evaporation or flushing with nitrogen or it can be slurried to an oily liquid without any drying step.

The finally obtained specific type of Ziegler-Natta catalyst is desirably obtained in the form of particles having generally an average particle size range of 5 to 200 μm, preferably 10 to 100 μm. The particles are generally compact with low porosity and have generally a surface area below 20 g/m², more preferably below 10 g/m². Typically, the amount of Ti present in the catalyst is in the range of from 1 to 6 wt %, the amount of Mg is in the range of from 10 to 20 wt % and the amount of internal donor present in the catalyst is in the range of from 10 to 40 wt % of the catalyst composition. A detailed description of the preparation of the catalysts used in the present invention is disclosed in WO2012/007430, EP2610271 and EP2610272 which are incorporated here by reference.

An external donor (ED) is preferably present as a further component in the polymerization process according to the invention. Suitable external donors (ED) include certain silanes, ethers, esters, amines, ketones, heterocyclic compounds and blends of these. It is especially preferred to use a silane. It is most preferred to use silanes of the general formula (I)

wherein $R^a$, $R^b$ and $R^c$ denote a hydrocarbon radical, in particular an alkyl or cycloalkyl group, and wherein p and q are numbers ranging from 0 to 3 with their sum (p+q) being equal to or less than 3. $R^a$, $R^b$ and $R^c$ can be chosen independently from one another and can be the same or different. Specific examples of silanes according to formula (I) are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$. Another most preferred silane is according to the general formula (II)

wherein $R^3$ and $R^4$ can be the same or different and represent a linear, branched or cyclic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. Most preferably ethyl is used.

Generally, in addition to the Ziegler-Natta catalyst or the specific type of Ziegler-Natta catalyst and the optional external donor (ED) a co-catalyst (Co) can be present in the polymerization process according to the invention. The co-catalyst is preferably a compound of group 13 of the periodic table (IUPAC, version 2013), such as for example an aluminum compound, e.g. an organo aluminum or aluminum halide compound. An example of a suitable organo aluminium compound is an aluminum alkyl or aluminum alkyl halide compound. Accordingly, in one specific embodiment the co-catalyst (Co) is a trialkylaluminum, like triethylaluminium (TEAL), dialkyl aluminium chloride or alkyl aluminium dichloride or mixtures thereof. In one specific embodiment the co-catalyst (Co) is triethylaluminium (TEAL).

Generally, the molar ratio between the co-catalyst (Co) and the external donor (ED) [Co/ED] and/or the molar ratio between the co-catalyst (Co) and the transition metal (TM) [Co/TM] is carefully chosen for each process. The molar ratio between the co-catalyst (Co) and the external donor (ED), [Co/ED] can suitably be in the range of from 2.5 to 50.0 mol/mol, preferably in the range of from 4.0 to 35.0 mol/mol, more preferably in the range of from 5.0 to 30.0 mol/mol.

The molar ratio between the co-catalyst (Co) and the transition metal (TM) [Co/TM] can suitably be in the range of from 20.0 to 500.0 mol/mol, preferably in the range of from 50.0 to 400.0 mol/mol, more preferably in the range of from 100.0 to 300.0 mol/mol.

Terpolymer of Propylene with Ethylene and 1-Butene Comonomer Units (B)

The terpolymer of propylene with ethylene and 1-butene comonomer units (B), in the following "terpolymer (B)", comprises, preferably consists of propylene monomer units, ethylene comonomer units and 1-butene comonomer units.

The terpolymer (B) can comprise additional comonomer units selected from alpha olefins having from 5 to 12 carbon atoms, preferably selected from 1-hexene and 1-octene.

It is, however, preferred that the terpolymer (B) consists of propylene monomer units, ethylene comonomer units and 1-butene comonomer units.

It is preferred that the comonomer units are randomly distributed in the polymer chain so that the terpolymer (B) preferably is a random terpolymer of propylene with ethylene and 1-butene comonomer units.

It is preferred that the terpolymer (B) has an ethylene content in the range of from 0.5 wt % to 3.5 wt %, more preferably in the range of from more than 1.0 wt % to 3.0 wt %, even more preferably in the range of from 1.2 to 2.8 wt %, still more preferably in the range of from 1.3 to 2.7 wt.

It is further preferred that the terpolymer (B) has a 1-butene content in the range of from 5.0 to 10.0 wt %, more preferably in the range of from more than 5.5 wt % to 9.5 wt %, even more preferably in the range of from 6.0 to 9.0 wt %, still more preferably in the range of from 6.5 to 8.5 wt %.

Preferably the terpolymer (B) has a rather high content of propylene (C3), i.e. more than 86.5 wt %, i.e. more than 87.0 wt %, more preferably more than 88.0 wt %, like more than 90.0 wt %.

The terpolymer (B) preferably has a melt flow rate $MFR_2$ (230° C.) measured according to ISO 1133 in the range of from 1.0 to 50.0 g/10 min, preferably in the range of from 1.2 to 40.0 g/10 min, more preferably in the range of from 1.4 to 30.0 g/10 min, still more preferably in range of from 1.5 to 20.0 g/10 min.

Further, the terpolymer (B) can be defined by the xylene cold soluble (XCS) content measured according to ISO 6427. Accordingly the propylene polymer is preferably featured by a xylene cold soluble (XCS) content of not more than 20.0 wt %, more preferably of not more than 15.0 wt %.

Thus it is in particular appreciated that the terpolymer (B) has a xylene cold soluble (XCS) content in the range of 3.0 to 20.0 wt %, more preferably in the range of 5.0 to 15.0 wt % and most preferably in the range of 7.0 to 12.0 wt %.

Still further, the terpolymer (B) can be defined by the melting temperature (Tm) measured via DSC according to ISO 11357. Accordingly the propylene polymer has a melting temperature Tm of less than 140° C. Even more preferable the melting temperature Tm is in the range of 120° C. to 138° C., more preferably in the range of 124° C. to 136° C.

The crystallisation temperature measured via DSC according to ISO 11357 of the terpolymer (B) should be equal or higher than 90° C., preferably in the range of 90° C. to 120° C., and even more preferably in the range of 95° C. to 115° C.

The terpolymer (B) is present in the polypropylene based composition in an amount of from 5.0 wt % to 15.0 wt %, preferably of from 6.0 wt % to 12.0 wt %, more preferably of from 6.5 wt % to 10.0 wt %, based on the total weight amount of the polypropylene based composition.

The terpolymer (B) can be further unimodal or multimodal, like bimodal in view of the molecular weight distribution and/or the comonomer content distribution; both unimodal and bimodal propylene polymers are equally preferred.

If the terpolymer (B) is unimodal, it is preferably produced in a single polymerization step in one polymerization reactor (R1). Alternatively a unimodal propylene polymer can be produced in a sequential polymerization process using the same polymerization conditions in all reactors.

If the terpolymer (B) is multimodal, it is preferably produced in a sequential polymerization process using different polymerization conditions (amount of comonomer, hydrogen amount, etc.) in the reactors.

The terpolymer (B) is preferably produced in the presence of a Ziegler-Natta catalyst system.

The terpolymer (B) can be produced in a single polymerization step comprising a single polymerization reactor or in a sequential polymerization process comprising at least two polymerization reactors, whereby in the first polymerization reactor a first propylene polymer fraction is produced, which is subsequently transferred into the second polymerization reactor. In the second polymerization reactor a second propylene polymer fraction is then produced in the presence of the first propylene polymer fraction.

If the propylene polymer is produced in at least two polymerization reactors, it is possible that i) in the first reactor a propylene homopolymer and in the second reactor a propylene terpolymer is produced, yielding the terpolymer (B) or ii) in the first reactor a propylene-ethylene copolymer and in the second reactor a propylene-1-butene copolymer is produced, yielding the terpolymer (B) or iii) in the first reactor a propylene-1-butene copolymer and in the second reactor a propylene-ethylene copolymer is produced, yielding the terpolymer (B) or iv) in the first reactor a propylene terpolymer and in the second reactor a propylene terpolymer is produced, yielding the terpolymer (B).

Polymerization processes which are suitable for producing the propylene polymer generally comprises one or two polymerization stages and each stage can be carried out in solution, slurry, fluidized bed, bulk or gas phase.

The term "polymerization reactor" shall indicate that the main polymerization takes place. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the terpolymer (B) can be produced in at least two reactors connected in series. Accordingly such a polymerization system comprises at least a first polymerization reactor and a second polymerization reactor, and optionally a third polymerization reactor.

The first, respectively the single, polymerization reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

In case a "sequential polymerization process" is applied the second polymerization reactor and the optional third polymerization reactor are gas phase reactors (GPRs), i.e. a first gas phase reactor and a second gas phase reactor. A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

Preferably the terpolymer (B) is produced in the presence of a Ziegler-Natta catalyst. The Ziegler-Natta catalyst is fed into the first, respectively the single, polymerization reactor and is optionally transferred with the polymer (slurry) obtained in the first polymerization reactor into the subsequent reactors, if the propylene polymer is produced in a sequential polymerization process.

If the process covers also a pre-polymerization step it is preferred that all of the Ziegler-Natta catalyst is fed in the pre-polymerization reactor. Subsequently the pre-polymerization product containing the Ziegler-Natta catalyst is transferred into the first, respectively the single, polymerization reactor.

Preferably, the Ziegler-Natta catalyst comprises a high-yield Ziegler-Natta type catalyst including an internal donor component, which can be used at high polymerization temperatures of 80° C. or more.

Such high-yield Ziegler-Natta catalyst can comprise a succinate, a diether, a phthalate etc., or mixtures therefrom as internal donor (ID) and are for example commercially available for example from LyondellBasell under the Avant ZN trade name.

Further useful solid catalysts are also those disclosed in WO-A-2003/000757, WO-A-2003/000754, WO-A-2004/029112 and WO2007/137853. These catalysts are solid catalysts of spherical particles with compact structure and low surface area of the particles. Further, these catalysts are featured by a uniform distribution of catalytically active sites thorough the catalyst particles. Catalysts are prepared by emulsion-solidification method, where no external support is needed. The dispersed phase in the form of liquid droplets of the emulsion forms the catalyst part, which is transformed to solid catalyst particles during the solidification step.

Thus, in an embodiment of the present invention, the solid catalyst component is prepared by a process comprising:

preparing a solution of magnesium complex by reacting an alkoxy magnesium compound and an electron donor or a precursor thereof in a $C_6$-$C_{10}$ aromatic liquid reaction medium;

reacting said magnesium complex with a four valent titanium compound, preferably $TiCl_4$, at a temperature greater than 10° C. and less than 50° C. to produce an emulsion of a denser, dispersed phase having Ti/Mg mol ratio 0.1 to 10 and in a continuous phase having Ti/Mg mol ratio 10 to 100; and agitating the emulsion, optionally in the presence of an emulsion stabilizer and/or a turbulence minimizing agent, in order to maintain the droplets of said dispersed phase within an average size range of 5 to 200 μm.

The catalyst particles are obtained after solidifying said droplets of the dispersed phase by heating, preferably at a temperature from 80° C. to 110° C. In said process an aluminium alkyl compound of the formula $AlR_{3-n}X_n$, where R is an alkyl and/or an alkoxy group of 1 to 20, preferably of 1 to 10 carbon atoms, X is a halogen and n is 0, 1 or 2, is added and brought into contact with the droplets of the dispersed phase of the agitated emulsion. Alternatively, the aluminium alkyl compound of the formula $AlR_{3-n}X_n$, is brought into contact with the solidified particles at the washing step before recovering the final solid particles.

Suitable internal electron donors are, among others, (di) esters of aromatic (di)carboxylic acids. Said aromatic carboxylic acid ester or diester can be formed in situ by reaction of an aromatic carboxylic acid chloride or diacid chloride with a C2-C16 alkanol and/or diol, and is preferable di-2-ethyl-hexyl phthalate.

A further suitable catalyst for the present invention is a solid Ziegler-Natta catalyst, which comprises compounds of a transition metal of Group 4 to 6 of IUPAC, like titanium, a Group 2 metal compound, like a magnesium, and an internal donor being a non-phthalic compound, more preferably a non-phthalic acid ester, still more preferably being a diester of non-phthalic dicarboxylic acids as described in more detail below. Further, the solid catalyst is free of any external support material, like silica or MgCl2, but the catalyst is self-supported.

This Ziegler-Natta catalyst can be further defined by the way as obtained.

Accordingly, the Ziegler-Natta catalyst is preferably obtained by a process comprising the steps of a)

a1) providing a solution of at least a Group 2 metal alkoxy compound (Ax) being the reaction product of a Group 2 metal compound and a monohydric alcohol (A) comprising in addition to the hydroxyl moiety at least one ether moiety optionally in an organic liquid reaction medium; or a2) a solution of at least a Group 2 metal alkoxy compound (Ax') being the reaction product of a Group 2 metal compound and an alcohol mixture of the monohydric alcohol (A) and a monohydric alcohol (B) of formula ROH, optionally in an organic liquid reaction medium; or a3) providing a solution of a mixture of the Group 2 alkoxy compound (Ax) and a Group 2 metal alkoxy compound (Bx) being the reaction product of a Group 2 metal compound and the monohydric alcohol (B), optionally in an organic liquid reaction medium; or a4) providing a solution of Group 2 alkoxide of formula $M(OR1)_n(OR2)_mX_{2-n-m}$ or mixture of Group 2 alkoxides $M(OR1)_{n'}X_{2-n'}$ and $M(OR2)_{m'}X_{2-m'}$, where M is Group 2 metal, X is halogen, R1 and R2 are different alkyl groups with C2 to C16 carbon atoms, and $0 \le n < 2$, $0 \le m < 2$ and $n+m+(2-n-m)=2$, provided that both n and m≠0, $0 < n' < 2$ and $0 < m' < 2$; and b) adding said solution from step a) to at least one compound of a transition metal of Group 4 to 6 and c) obtaining the solid catalyst component particles, and adding a non-phthalic internal donor, at any step prior to step c).

The internal donor or precursor thereof is added preferably to the solution of step a).

According to the procedure above the Ziegler-Natta catalyst can be obtained via precipitation method or via emulsion (liquid/liquid two-phase system)-solidification method depending on the physical conditions, especially temperature used in steps b) and c).

In both methods (precipitation or emulsion-solidification) the catalyst chemistry is the same.

In precipitation method combination of the solution of step a) with at least one transition metal compound in step b) is carried out and the whole reaction mixture is kept at least at 50° C., more preferably in the temperature range of 55° C. to 110° C., more preferably in the range of 70° C. to 100° C., to secure full precipitation of the catalyst component in form of a solid particles (step c).

In emulsion-solidification method in step b) the solution of step a) is typically added to the at least one transition metal compound at a lower temperature, such as from −10° C. to below 50° C., preferably from −5° C. to 30° C. During agitation of the emulsion the temperature is typically kept at −10 to below 40° C., preferably from −5° C. to 30° C. Droplets of the dispersed phase of the emulsion form the active catalyst composition. Solidification (step c) of the droplets is suitably carried out by heating the emulsion to a temperature of 70° C. to 150° C., preferably to 80° C. to 110° C.

The catalyst prepared by emulsion-solidification method is preferably used in the present invention.

In a preferred embodiment in step a) the solution of a2) or a3) are used, i.e. a solution of (Ax') or a solution of a mixture of (Ax) and (Bx).

Preferably the Group 2 metal is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are C2 to C4 glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycolmonobutyl ether, 3-butoxy-2-propanol, with 2-(2-ethylhexyloxy)ethanol and 1,3-propyleneglycol-monobutyl ether, 3-butoxy-2-propanol being particularly preferred.

Illustrative monohydric alcohols (B) are of formula ROH, with R being a straight-chain or branched C6-C10 alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different C1-C20 alkyl, preferably C2-C10 alkyl. Typical alkylalkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R"(OH)m to obtain said magnesium alkoxide compounds. Preferred polyhydric alcohols, if used, are alcohols, wherein R" is a straight-chain, cyclic or branched C2 to C10 hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred. Mg compound is typically provided as a 10 to 50 wt % solution in a solvent as indicated above. Typical commercially available Mg compound, especially dialkyl magnesium solutions are 20-40 wt % solutions in toluene or heptanes.

The reaction for the preparation of the magnesium alkoxy compound may be carried out at a temperature of 40° C. to 70° C. Most suitable temperature is selected depending on the Mg compound and alcohol(s) used.

The transition metal compound of Group 4 to 6 is preferably a titanium compound, most preferably a titanium halide, like $TiCl_4$.

The non-phthalic internal donor that can be used in the preparation of the catalyst is preferably selected from (di) esters of non-phthalic carboxylic (di)acids, 1,3-diethers, derivatives and mixtures thereof. Especially preferred donors are diesters of monounsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from alpha-olefin polymers of alpha-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m2, more preferably below 10 g/m². Typically the amount of Ti is 1 to 6 wt %, Mg 10 to 20 wt % and donor 10 to 40 wt % of the catalyst composition.

Detailed description of preparation of catalysts is disclosed in WO 2012/007430, EP2610271, EP2610270 and EP2610272.

The Ziegler-Natta catalyst is optionally modified by the so called BNT-technology during a pre-polymerization step in order to introduce a polymeric nucleating agent. Such a polymeric nucleating agent is preferably a vinyl polymer, such as a vinyl polymer derived from monomers of the formula

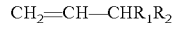

wherein $R_1$ and $R_2$, together with the carbon atom they are attached to, form an optionally substituted saturated or unsaturated or aromatic ring or a fused ring system, wherein the ring or fused ring moiety contains 4 to 20 carbon atoms, preferably 5 to 12 membered saturated or unsaturated or aromatic ring or a fused ring system or independently represent a linear or branched $C_4$-$C_{30}$-alkane, $C_4$-$C_{20}$-cycloalkane or $C_4$-$C_{20}$-aromatic ring. Preferably $R_1$ and $R_2$, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

The weight ratio of vinyl compound to polymerization catalyst in the modification step of the polymerization catalyst preferably is 0.3 or more up to 40.0, such as 0.4 to 20.0 or more preferably 0.5 to 15.0, like 0.5 to 2.0.

The polymerization of the vinyl compound, e. g. VCH, can be done in any inert fluid that does not dissolve the polymer formed (e. g. polyVCH). It is important to make sure that the viscosity of the final catalyst/polymerized vinyl compound/inert fluid mixture is sufficiently high to prevent the catalyst particles from settling during storage and transport.

The adjustment of the viscosity of the mixture can be done either before or after the polymerization of the vinyl compound. It is, e. g., possible to carry out the polymerization in a low viscosity oil and after the polymerization of the vinyl compound the viscosity can be adjusted by addition of a highly viscous substance. Such highly viscous substance can be a "wax", such as an oil or a mixture of an oil with a solid or highly viscous substance (oilgrease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerized vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10.0, preferably less than 3.0, more preferably about 0.1 to 2.0, and in particular about 0.1 to 1.5. It should be noted that no benefits are achieved by using vinyl compounds in excess.

Further, the reaction time of the catalyst modification by polymerization of a vinyl compound should be sufficient to allow for complete reaction of the vinyl monomer, i.e. the polymerization is continued until the amount of unreacted vinyl compounds in the reaction mixture (including the polymerization medium and the reactants) is less than 0.5 wt %, in particular less than 2000 ppm by weight (shown by analysis). Thus, when the prepolymerized catalyst contains a maximum of about 0.1 wt % vinyl compound, the final vinyl compound content in the polypropylene will be below the limit of determination using the GCMS method (<0.01 ppm by weight). Generally, when operating on an industrial scale, a polymerization time of at least 30 minutes is required, preferably the polymerization time is at least 1 hour and in particular at least 5 hours. Polymerization times even in the range of 6 to 50 hours can be used. The modification can be done at temperatures of 10° C. to 60° C., preferably 15° C. to 55° C.

General conditions for the modification of the catalyst are also disclosed in WO 00/6831, incorporated herein by reference with respect to the modification of the polymerization catalyst.

The preferred embodiments as described previously in the present application with respect to the vinyl compound also apply with respect to the polymerization catalyst of the present invention and the preferred polypropylene composition in accordance with the present invention.

Suitable media for the modification step include, in addition to oils, also aliphatic inert organic solvents with low viscosity, such as pentane and heptane. Furthermore, small amounts of hydrogen can be used during the modification.

The Ziegler-Natta catalyst is preferably used in association with an alkyl aluminum cocatalyst and optionally external donors.

As further component in the instant polymerization process an external donor is preferably present. Suitable external donors include certain silanes, ethers, esters, amines, ketones, heterocyclic compounds and blends of these. It is especially preferred to use a silane. It is most preferred to use silanes of the general formula

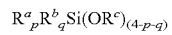

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$, or of general formula

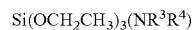

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both R3 and R4 are the same, yet more preferably both R3 and R4 are an ethyl group.

Especially preferred external donors are the dicyclopentyl dimethoxy silane donor (D-donor) or the cyclohexylmethyl dimethoxy silane donor (C-Donor).

In addition to the Ziegler-Natta catalyst and the optional external donor, a co-catalyst can be used. The co-catalyst is preferably a compound of group 13 of the periodic table (IUPAC), e.g. organo aluminum, such as an aluminum compound, like aluminum alkyl, aluminium halide or aluminum alkyl halide compound.

Accordingly, in one specific embodiment the cocatalyst is a trialkylaluminum, like triethylaluminium (TEAL), dialkyl aluminium chloride or alkyl aluminium dichloride or mixtures thereof. In one specific embodiment the co-catalyst is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly, (a) the mol-ratio of co-catalyst (Co) to external donor (ED) [Co/ED] must be in the range of from 5.0 to 45.0, preferably is in the range of from 5.0 to 35.0, more preferably is in the range of from 5.0 to 25.0; and optionally (b) the mol-ratio of co-catalyst (Co) to titanium compound (TC) [Co/TC] must be in the range of above 80.0 to 500.0, preferably is in the range of from 100.0 to 350.0, still more preferably is in the range of from 120.0 to 300.0.

The propylene polymer used according to this invention is thus preferably produced in the presence of (a) a Ziegler-Natta catalyst comprising an internal donor,
(b) optionally a co-catalyst (Co), and
(c) optionally an external donor (ED).

Ethylene Copolymer with Alpha-Olefin Comonomer Units Having from 4 to 12 Carbon Atoms (C)

The ethylene copolymer with alpha-olefin comonomer units having from 4 to 12 carbon atoms (C), in the following ethylene copolymer (C), preferably is an ethylene based plastomer.

The ethylene copolymer (C) is a copolymer of ethylene and a $C_4$-$C_{12}$ alpha-olefin. Suitable $C_4$-$C_{12}$ alpha-olefins include 1-butene, 1-hexene and 1-octene, preferably 1-butene or 1-octene and more preferably 1-octene.

Preferably copolymers of ethylene and 1-octene are used.

Suitable ethylene copolymers (C) have a density in the range of from 850 kg/m$^3$ to 900 kg/m$^3$, preferably in the range of from 855 kg/m$^3$ to 895 kg/m$^3$, more preferably in the range of from 860 kg/m$^3$ to 890 kg/m$^3$, still more preferably in the range of from 865 kg/m$^3$ to 885 kg/m$^3$.

The MFR$_2$ (ISO 1133; 190° C.; 2.16 kg) of suitable ethylene copolymers (C) is in the range of from 0.1 to 20.0 g/10 min, preferably in the range of from 0.2 to 15.0 g/10 min, more preferably in the range of from 0.3 to 10.0 g/10 min, like in the range of 0.5 to 5.0 g/10 min.

The melting temperatures (measured with DSC according to ISO 11357-3) of suitable ethylene copolymers (C) are below 100° C., preferably below 90° C., more preferably below 80° C. Normally, said melting temperatures will not be lower than 40° C.

Furthermore suitable ethylene copolymers (C) have a glass transition temperature Tg (measured with DMTA according to ISO 6721-7) of below −25° C., preferably below −30° C., more preferably below −35° C.

In case the ethylene copolymer (C) is a copolymer of ethylene and a $C_4$-$C_{12}$ alpha olefin it has an ethylene content from 60.0 to 90.0 wt %, preferably from 65.0 to 85.0 wt % and more preferably from 67.0 to 82.0 wt %, like from 70.0 to 80.0 wt %.

The molecular weight distribution Mw/Mn of suitable ethylene copolymers (C) is most often below 4.0, such as 3.8 or below, but is at least 1.7. It is preferably between 3.5 and 1.8.

The ethylene copolymer (C) is present in the polypropylene based composition in an amount of from 5.0 wt % to 25.0 wt %, preferably of from 7.0 wt % to 22.0 wt %, more preferably of from 9.0 wt % to 21.0 wt % and most preferably of from 10.0 wt % to 20.0 wt %, based on the total weight amount of the polypropylene based composition.

Suitable ethylene copolymers (C) can be any copolymer of ethylene and propylene or ethylene and $C_4$-$C_{12}$ alpha olefin having the above defined properties, which are commercially available, i.a. from Borealis under the tradename Queo, from DOW under the tradename Engage or Affinity, or from Mitsui under the tradename Tafmer.

Alternately these ethylene copolymers (C) can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons.

Preferably these ethylene copolymers (C) are prepared by a one stage or two stage solution polymerization process, especially by high temperature solution polymerization process at temperatures higher than 100° C.

Such a process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110° C., more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably unsubstituted $C_6$-$C_{10}$-hydrocarbon solvents are used.

A known solution technology suitable for the process according to the invention is the COMPACT technology.

Inorganic Filler (D)

A further requirement of the composition according to this invention is the presence of an inorganic filler (D).

Preferably the inorganic filler (D) is a mineral filler. It is appreciated that the inorganic filler (D) is a phyllosilicate, mica or wollastonite. Even more preferred the inorganic filler (D) is selected from the group consisting of mica, wollastonite, kaolinite, smectite, montmorillonite and talc.

The most preferred inorganic fillers (D) are talc and/or wollastonite.

It is appreciated that the inorganic filler (D) has median particle size (D$_{50}$) in the range of 0.5 to 5.0 µm, preferably in the range of 0.7 to 3.0 µm, and most preferably in the range of 1.0 to 2.5 µm.

It is further preferred that the inorganic filler (D) has a BET surface area of from 5.0 to 30.0 m$^2$/g, more preferably of from 7.5 to 25.0 m$^2$/g, and most preferably of from 10.0 to 20 m$^2$/g.

According to this invention the inorganic filler (D) does not belong to the class of additives.

The inorganic filler (D) is state of the art and a commercially available product.

The inorganic filler (D) is present in the polypropylene based composition in an amount of from 5.0 wt % to 25.0 wt %, preferably of from 8.0 wt % to 22.0 wt %, more preferably of from 10.0 wt % to 20.0 wt %, based on the total weight amount of the polypropylene based composition.

Additives

In addition the heterophasic propylene copolymer (A), the terpolymer (B), the ethylene copolymer (C) and the inorganic filler (D), and the polypropylene based composition of the invention may include additives. Typical additives are acid scavengers, antioxidants, colorants, light stabilisers, plasticizers, slip agents, anti-scratch agents, dispersing agents, processing aids, lubricants, pigments, and the like.

As indicated above the inorganic filler (D) is not regarded as an additive.

Such additives are commercially available and for example described in "Plastic Additives Handbook", 6$^{th}$ edition 2009 of Hans Zweifel (pages 1141 to 1190).

The polypropylene based composition preferably comprises additives in an amount of not more than 10 wt %, more preferably not more than 5 wt %, and most preferably not more than 3 wt %, based on the weight of the polypropylene based composition.

Furthermore, the term "additives" according to the present invention also includes carrier materials, in particular polymeric carrier materials.

Polymeric Carrier Material

Preferably the polypropylene based composition of the invention does not comprise (a) further polymer(s) different to the heterophasic propylene copolymer (A), the terpolymer (B) and the ethylene copolymer (C) in an amount exceeding 5 wt.-%, preferably in an amount exceeding 3 wt.-%, more preferably in an amount exceeding 1.5 wt.-%, based on the weight of the polypropylene based composition.

In a preferred embodiment the polypropylene based composition does not comprise any further polymer(s) different to the heterophasic propylene copolymer (A), the terpolymer (B) and the ethylene copolymer (C).

Any polymer being a carrier material for additives is not calculated to the amount of polymeric compounds as indicated in the present invention, but to the amount of the respective additive.

The polymeric carrier material of the additives is a carrier polymer to ensure a uniform distribution in the polypropylene composition (C) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer. It is preferred that the polymeric carrier material does not contain monomeric units derivable from styrene or derivatives thereof.

Polypropylene Based Composition

The polypropylene based composition according to the invention comprises (A) from 40.0 to 85.0 wt %, preferably from 45.0 wt % to 80.0 wt %, more preferably from 50.0 wt % to 75.0 wt % of the heterophasic propylene copolymer having a content of xylene cold soluble (XCS) fraction in the range of 15 wt % to 35 wt %;

(B) from 5.0 to 15.0 wt %, preferably from 6.0 wt % to 12.0 wt %, more preferably from 6.5 wt % to 10.0 wt % of the terpolymer of propylene with ethylene and 1-butene comonomer units having a melting temperature Tm as measured in differential scanning calorimetry (DSC) of less than 140° C.;

(C) from 5.0 to 25.0 wt %, preferably of from 7.0 wt % to 22.0 wt %, more preferably of from 9.0 wt % to 21.0 wt % and most preferably of from 10.0 wt % to 20.0 wt % of the ethylene copolymer with alpha-olefin comonomer units having from 4 to 12 carbon atoms with a density of from 850 kg/m$^3$ to 900 kg/m$^3$; and (D) from 5.0 to 25.0 wt %, preferably of from 7.5 wt % to 23.0 wt %, more preferably of from 10.0 wt % to 21.0 wt % and most preferably of from 12.0 wt % to 20.0 wt % of the inorganic filler, wherein the amounts of components (A), (B), (C), and (D) are all based on the total weight amount of the polypropylene based composition.

The components (A), (B), (C) and (D) are preferably as defined above or below.

Optionally, the polypropylene based composition can further comprise additives as defined above and below in an amount of up to 10 wt %.

Further, the polypropylene based composition can further comprise additional polymers different from components (A), (B) and (C) in an amount of not more than 5 wt.-%, preferably in an amount of not more than 3 wt.-%, more preferably in an amount of not more than 1.5 wt.-%, based on the weight of the polypropylene based composition.

In a preferred embodiment the polypropylene based composition does not comprise any further polymer(s) different to the heterophasic propylene copolymer (A), the terpolymer (B) and the ethylene copolymer (C).

The polypropylene based composition preferably has an MFR$_2$ (2.16 kg, 230° C.) in the range of 2.0 to 20.0 g/10 min, preferably in the range of 4.0 to 18.0 g/10 min, more preferably in the range of 6.0 to 16.0 g/10 min, like in the range of 7.0 to 14.0 g/10 min.

The polypropylene based composition preferably has a flexural modulus of at least 1300 MPa, more preferably of at least 1400 MPa, and most preferably of at least 1500 MPa. The upper limit of the flexural modulus is usually not higher than 2500 MPa, preferably not higher than 2200 MPa.

Further, the polypropylene based composition preferably has a Charpy notched Impact Strength at 23° C. of at least 50 kJ/m$^2$, more preferably of from 55 to 100 kJ/m$^2$, most preferably of from 60 to 90 kJ/m$^2$.

Still further, the polypropylene composition preferably has a Charpy notched Impact Strength at −20° C. of at least 5.0 kJ/m$^2$, more preferably of from 6.0 to 20.0 kJ/m$^2$, most preferably of from 6.5 to 15.0 kJ/m$^2$.

Even further, the polypropylene based composition preferably has a heat deflection temperature B (HDT-B) in the range of from 80° C. to 120° C., more preferably of from 85° C. to 115° C. and most preferably of from 90° C. to 110° C.

Articles and Uses According to the Invention

The present invention is further directed to an article comprising the polypropylene based composition as defined above or below.

In one aspect of the present invention the article comprising the polypropylene based composition as defined above or below is a painted article.

Preferably the article as well as the painted article are based on a molded article, such as an injection moulded article. Especially preferred are injection moulded articles such as automotive articles, i.e. exterior or interior automotive articles.

The term "automotive article" used in the instant invention indicates that it is a formed three-dimensional article for the interior or exterior of automotives. Typical automotive articles are bumpers, side trims, step assists, body panels, rocker panels, spoilers, dash boards, interior trims and the like. The term "exterior" indicates that the article is not part of the car interior but part of the car's exterior. Accordingly, preferred exterior automotive articles are selected from the group consisting of bumpers, side trims, step assists, body panels, and spoilers. In contrast thereto, the term "interior" indicates that the article is part of the car interior but not part of the car's exterior. Accordingly, preferred interior automotive articles are selected from the group consisting of rocker panels, dash boards and interior trims. The painting can be present on part of the visible surface or the complete visible surface of the painted article.

Preferably the automotive article, i.e. the exterior automotive article, comprises equal or more than 80.0 wt.-%, more preferably equal or more than 90.0 wt.-%, yet more preferably equal or more than 95.0 wt.-%, still more preferably equal or more than 99.0 wt.-%, still yet more preferably consists, of the polypropylene based composition.

For mixing the individual components of the instant polypropylene based composition, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then preferably further processed, e.g. by injection molding to generate the articles, i.e. the (interior or exterior) automotive articles.

Preferably the article according to the invention has a shrinkage in radial direction of less than 1.0%, more preferably of less than 0.9% and most preferably of less than 0.8%.

It is further preferred that the article according to the invention has a paint adhesion failure as average delaminated area of from 10.0 mm$^2$ to 50.0 mm$^2$, more preferably of from 12.0 mm$^2$ to 35.0 mm$^2$, still more preferably of from 13.0 mm$^2$ to 32 mm$^2$ and most preferably of from 15.0 mm$^2$ to 30.0 mm$^2$.

From the example section below it can be seen that especially the presence of the terpolymer of propylene with ethylene and 1-butene comonomer units (B) in the polypropylene based composition reduces the paint adhesion failure of the article. Therefore, the present invention is further related to the use of a terpolymer of propylene with ethylene and 1-butene comonomer units in a polypropylene based composition comprising (A) from 40.0 to 85.0 wt % of a heterophasic propylene copolymer having a content of xylene cold soluble (XCS) fraction in the range of 15 wt % to 35 wt %, based on the total weight of the heterophasic propylene copolymer;
(B) from 5.0 to 15.0 wt % of a terpolymer of propylene with ethylene and 1-butene comonomer units having a melting temperature Tm as measured in differential scanning calorimetry (DSC) of less than 140° C.;
(C) from 5.0 to 25.0 wt % of an ethylene copolymer with alpha-olefin comonomer units having from 4 to 12 carbon atoms with a density of from 850 kg/m$^3$ to 900 kg/m$^3$; and
(D) from 5.0 to 25.0 wt % of an inorganic filler;
wherein the amounts of components (A), (B), (C), and (D) are all based on the total weight amount of the polypropylene based composition, said composition having a melt flow rate (MFR2) as measured at 230° C. and 2.16 kg load in accordance with ISO 1133 in the range of 2.0 g/10 min to 20 g/10 min,
for reducing the paint adhesion failure of an article comprising said polypropylene based composition.

Thereby, the polypropylene based composition and the terpolymer of propylene with ethylene and 1-butene comonomer units preferably relate to the polypropylene based composition and the terpolymer of propylene with ethylene and 1-butene comonomer units (B) as defined above or below.

Accordingly, it is to be noted that the articles prepared from the polypropylene based composition as defined herein show a good stiffness/impact balance and high paint adhesion. Furthermore, the high paint adhesion is obtained without the use of primers.

The present invention will now be described in further detail by the examples provided below.

EXAMPLES

1. Determination Methods a) Xylene Cold Solubles Fraction at Room Temperature (XCS, Wt %)

The amount of polymer fraction soluble in xylene is determined according to ISO 16152:2005.

b) Melt Flow Rate (MFR$_2$)

The melt flow rate is the quantity of polymer in grams which the test apparatus standardized to ISO 1133 extrudes within 10 minutes at a certain temperature under a certain load.

The melt flow rate MFR$_2$ of the propylene based polymers is measured at 230° C. with a load of 2.16 kg (MFR230° C./2.16) according to ISO 1133.

The melt flow rate MFR$_2$ of the ethylene copolymer is measured at 190° C. with a load of 2.16 kg (MFR190° C./2.16) according to ISO 1133.

The melt flow rate MFR$_2$ of the polypropylene based composition is measured at 230° C. with a load of 2.16 kg (MFR230° C./2.16) according to ISO 1133.

c) Density

The density is measured according to ISO 1183D. The samples preparation is carried out by compression moulding according to ISO 1872-2:2007.

d) Comonomer Content

Quantitative nuclear-magnetic resonance (NMR) spectroscopy was used to quantify the comonomer content of the polymers.

Comonomer content quantification of poly(propylene-co-ethylene) copolymers Quantitative $^{13}$C{$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probe head at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent {8}. To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme {3, 4}. A total of 6144 (6 k) transients were acquired per spectra.

Quantitative $^{13}$C{$^1$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed {7}.

The comonomer fraction was quantified using the method of Wang et. al. {6} through integration of multiple signals across the whole spectral region in the $^{13}C\{^1H\}$ spectra. This method was chosen for its robust nature and ability to account for the presence of regiodefects when needed. Integral regions were slightly adjusted to increase applicability across the whole range of encountered comonomer contents. For systems where only isolated ethylene in PPEPP sequences was observed the method of Wang et al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et al. {6}. Equations used for absolute propylene content were not modified.

The mole percent comonomer incorporation was calculated from the mole fraction:

$$E\ [mol\ \%]=100*fE$$

The weight percent comonomer incorporation was calculated from the mole fraction:

$$E\ [wt\ \%]=100*(fE*28.06)/((fE*28.06)+((1-fE)*42.08))$$

BIBLIOGRAPHIC REFERENCES

1) Busico, V., Cipullo, R., Prog. Polym. Sci. 26 (2001) 443.
2) Busico, V., Cipullo, R., Monaco, G., Vacatello, M., Segre, A. L., Macromolecules 30 (1997) 6251.
3) Zhou, Z., Kuemmerle, R., Qiu, X., Redwine, D., Cong, R., Taha, A., Baugh, D. Winniford, B., J. Mag. Reson. 187 (2007) 225.
4) Busico, V., Carbonniere, P., Cipullo, R., Pellecchia, R., Severn, J., Talarico, G., Macromol. Rapid Commun. 2007, 28, 1128.
5) Resconi, L., Cavallo, L., Fait, A., Piemontesi, F., Chem. Rev. 2000, 100, 1253.
6) Wang, W-J., Zhu, S., Macromolecules 33 (2000), 1157.
7) Cheng, H. N., Macromolecules 17 (1984), 1950.
8) Singh, G., Kothari, A., Gupta, V., Polymer Testing 28 5 (2009), 475.
9) Kakugo, M., Naito, Y., Mizunuma, K., Miyatake, T. Macromolecules 15 (1982) 1150.
10) Randall, J. Macromol. Sci., Rev. Macromol. Chem. Phys. 1989, C29, 201.
11) Resconi, L., Cavallo, L., Fait, A., Piemontesi, F., Chem. Rev. 2000, 100, 1253.

Comonomer Content Poly(Propylene-Co-Ethylene-Co-Butene)

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a 13C optimised 7 mm magic-angle spinning (MAS) probe head at 180° C. using nitrogen gas for all pneumatics. Approximately 200 mg of material was packed into a 7 mm outer diameter zirconia MAS rotor and spun at 4.5 kHz. This setup was chosen primarily for the high sensitivity needed for rapid identification and accurate quantification {1, 2, 6} Standard single-pulse excitation was employed utilising the NOE at short recycle delays {3, 1} and the RS-HEPT decoupling scheme {4, 5}. A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm. Characteristic signals corresponding to regio defects were not observed {11}. The amount of propene was quantified based on the main $S\alpha\alpha$ methylene sites at 44.1 ppm:

$$P\text{total}=I_{S\alpha\alpha}$$

Characteristic signals corresponding to the incorporation of 1-butene were observed and the comonomer content quantified in the following way. The amount isolated 1-butene incorporated in PPBPP sequences was quantified using the integral of the $\alpha$B2 sites at 44.1 ppm accounting for the number of reporting sites per comonomer:

$$B=I_{\alpha B2/2}$$

The amount consecutively incorporated 1-butene in PPBBPP sequences was quantified using the integral of the $\alpha\alpha$B2 site at 40.5 ppm accounting for the number of reporting sites per comonomer:

$$BB=2*I_{\alpha\alpha B2}$$

The total 1-butene content was calculated based on the sum of isolated and consecutively incorporated 1-butene:

$$B\text{total}=B+BB$$

The total mole fraction of 1-butene in the polymer was then calculated as:

$$fB=(B\text{total}/(E\text{total}+P\text{total}+B\text{total}))$$

Characteristic signals corresponding to the incorporation of ethylene were observed and the comonomer content quantified in the following way. The amount isolated ethylene incorporated in PPEPP sequences was quantified using the integral of the S$\alpha\gamma$ sites at 37.9 ppm accounting for the number of reporting sites per comonomer:

$$E=I_{S\alpha\gamma}/2$$

With no sites indicative of consecutive incorporation observed the total ethylene comonomer content was calculated solely on this quantity:

$$E\text{total}=E$$

The total mole fraction of ethylene in the polymer was then calculated as:

$$fE=(E\text{total}/(E\text{total}+P\text{total}+B\text{total}))$$

The mole percent comonomer incorporation was calculated from the mole fractions:

$$B\ [mol\ \%]=100*fB$$

$$E\ [mol\ \%]=100*fE$$

The weight percent comonomer incorporation was calculated from the mole fractions:

$$B\ [wt\ \%]=100*(fB*56.11)/((fE*28.05)+(fB*56.11)+((1-(fE+fB))*42.08))$$

$E \text{ [wt \%]}=100*(fE*28.05)/((fE*28.05)+(fB*56.11)+ ((1-(fE+fB))*42.08))$

BIBLIOGRAPHIC REFERENCES

1) Klimke, K., Parkinson, M., Piel, C., Kaminsky, W., Spiess, H. W., Wilhelm, M., Macromol. Chem. Phys. 2006; 207:382.
2) Parkinson, M., Klimke, K., Spiess, H. W., Wilhelm, M., Macromol. Chem. Phys. 2007; 208:2128.
3) Pollard, M., Klimke, K., Graf, R., Spiess, H. W., Wilhelm, M., Sperber, O., Piel, C., Kaminsky, W., Macromolecules 2004; 37:813.
4) Filip, X., Tripon, C., Filip, C., J. Mag. Resn. 2005, 176, 239.
5) Griffin, J. M., Tripon, C., Samoson, A., Filip, C., and Brown, S. P., Mag. Res. in Chem. 2007 45, S1, S198.
6) Castignolles, P., Graf, R., Parkinson, M., Wilhelm, M., Gaborieau, M., Polymer 50 (2009) 2373.
7) Busico, V., Cipullo, R., Prog. Polym. Sci. 26 (2001) 443.
8) Busico, V., Cipullo, R., Monaco, G., Vacatello, M., Segre, A. L., Macromolecules 30 (1997) 6251.
9) Zhou, Z., Kuemmerle, R., Qiu, X., Redwine, D., Cong, R., Taha, A., Baugh, D. Winniford, B., J. Mag. Reson. 187 (2007) 225.
10) Busico, V., Carbonniere, P., Cipullo, R., Pellecchia, R., Severn, J., Talarico, G., Macromol. Rapid Commun. 2007, 28, 1128.
11) Resconi, L., Cavallo, L., Fait, A., Piemontesi, F., Chem. Rev. 2000, 100, 1253.

Comonomer Content Quantification of Poly(Ethylene-Co-1-Octene) Copolymers

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probe-head at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification.[1],[2],[3],[4] Standard single-pulse excitation was employed utilising the transient NOE at short recycle delays of 3 s[5],[1] and the RS-HEPT decoupling scheme.[6],[7] A total of 1024 (1 k) transients were acquired per spectrum. This setup was chosen due to its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm.[8]

Characteristic signals corresponding to the incorporation of 1-octene were observed[8],[9],[10],[11],[12] and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.32 ppm. This integral is assigned to the unresolved signals corresponding to both *B6 and *βB6B6 sites of isolated (EEOEE) and isolated double non-consecutive (EEOEOEE) 1-octene sequences respectively. To compensate for the influence of the two *βB6B6 sites the integral of the ββB6B6 site at 24.7 ppm is used:

$O=I_{*B6+*\beta B6B6}-2*I_{\beta\beta B6B6}$

Characteristic signals resulting from consecutive 1-octene incorporation, i.e. EEOOEE comonomer sequences, were also observed. Such consecutive 1-octene incorporation was quantified using the integral of the signal at 40.48 ppm assigned to the αα1B6B6 sites accounting for the number of reporting sites per comonomer:

$OO=2*I_{\alpha\alpha B6B6}$

Characteristic signals resulting from isolated non-consecutive 1-octene incorporation, i.e. EEOEOEE comonomer sequences, were also observed. Such isolated non-consecutive 1-octene incorporation was quantified using the integral of the signal at 24.7 ppm assigned to the O3B6B6 sites accounting for the number of reporting sites per comonomer:

$OEO=2*I_{\beta\beta B6B6}$

Characteristic signals resulting from isolated triple-consecutive 1-octene incorporation, i.e. EEOOOEE comonomer sequences, were also observed. Such isolated triple-consecutive 1-octene incorporation was quantified using the integral of the signal at 41.2 ppm assigned to the ααγB6B6B6 sites accounting for the number of reporting sites per comonomer:

$OOO=3/2*I_{\alpha\alpha\gamma B6B6B6}$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EEOOOEE) 1-octene comonomer sequences:

$O_{total}=O+OO+OEO+OOO$

Characteristic signals resulting from saturated end-groups were observed. Such saturated end-groups were quantified using the average integral of the two resolved signals at 22.84 and 32.23 ppm. The 22.84 ppm integral is assigned to the unresolved signals corresponding to both 2B6 and 2S sites of 1-octene and the saturated chain end respectively. The 32.23 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$S=(\frac{1}{2})*(I_{2S+2B6}+I_{3S+3B6}-2*O_{total})$

The ethylene comonomer content was quantified using the integral of the bulk methylene (bulk) signals at 30.00 ppm. This integral included the γ and 4B6 sites from 1-octene as well as the δ+ sites. The total ethylene comonomer content was calculated based on the bulk integral and compensating for the observed 1-octene sequences and end-groups:

$E_{total}=(\frac{1}{2})*[I_{bulk}+2*O+1*OO+3*OEO+0*OOO+3*S]$

It should be noted that compensation of the bulk integral for the presence of isolated triple-incorporation (EEOOOEE) 1-octene sequences is not required as the number of under and over accounted ethylene units is equal.

The total mole fraction of 1-octene in the polymer was then calculated as:

$fO=(O_{total}/(E_{total}+O_{total}))$

The total comonomer incorporation of 1-octene in weight percent was calculated from the mole fraction in the standard manner:

$$O\ [wt\ \%] = 100*(fO*112.21)/((fO*112.21)+((1-fO)*28.05))$$

[1] Klimke, K., Parkinson, M., Piel, C., Kaminsky, W., Spiess, H. W., Wilhelm, M., Macromol. Chem. Phys. 2006; 207:382.
[2] Parkinson, M., Klimke, K., Spiess, H. W., Wilhelm, M., Macromol. Chem. Phys. 2007; 208:2128.
[3] Castignolles, P., Graf, R., Parkinson, M., Wilhelm, M., Gaborieau, M., Polymer 50 (2009) 2373
[4] NMR Spectroscopy of Polymers: Innovative Strategies for Complex Macromolecules, Chapter 24, 401 (2011)
15 [5] Pollard, M., Klimke, K., Graf, R., Spiess, H. W., Wilhelm, M., Sperber, O., Piel, C., Kaminsky, W., Macromolecules 2004; 37:813.
[6] Filip, X., Tripon, C., Filip, C., J. Mag. Resn. 2005, 176, 239
[7] Griffin, J. M., Tripon, C., Samoson, A., Filip, C., and Brown, S. P., Mag. Res. in Chem. 2007 45, S1, S198
[8] J. Randall, Macromol. Sci., Rev. Macromol. Chem. Phys. 1989, C29, 201.
[9] Liu, W., Rinaldi, P., McIntosh, L., Quirk, P., Macromolecules 2001, 34, 4757
[10] Qiu, X., Redwine, D., Gobbi, G., Nuamthanom, A., Rinaldi, P., Macromolecules 2007, 40, 6879
[11] Busico, V., Carbonniere, P., Cipullo, R., Pellecchia, R., Severn, J., Talarico, G., Macromol. Rapid Commun. 2007, 28, 1128
[12] Zhou, Z., Kuemmerle, R., Qiu, X., Redwine, D., Cong, R., Taha, A., Baugh, D. Winniford, B., J. Mag. Reson. 187 (2007) 225 e) DSC Analysis, Melting Temperature (Tm) and Crystallization Temperature (Tc):

measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30° C. to +225° C.

Crystallization temperature and heat of crystallization (Hc) are determined from the cooling step, while melting temperature and heat of fusion (Hf) are determined from the second heating step.

f) Intrinsic Viscosity (iV)

is measured according to DIN ISO 1628/1, October 1999 in decalin at 135° C.

g) BET Surface Area

The BET Surface Area was measured according to DIN 66131/2 with nitrogen (N2).

h) Median Particle Size $D_{50}$ (Sedimentation)

The median particle size $D_{50}$ was calculated from the particle size distribution [wt.-%] as determined by gravitational liquid sedimentation according to ISO 13317-3 (Sedigraph).

i) Flexural Modulus

The flexural modulus was determined according to ISO 178 at a test speed of 2 mm/min and a force of 100 N, whereby the length of the span between the supports was 64 mm, on test specimens having a dimension of 80×10×4 mm³ (length×width×thickness) prepared by injection moulding according to EN ISO 1873-2.

j) Charpy Notched Impact Strength

The Charpy Notched Impact Strength was determined according to ISO 179/1 eA at 23° C. and at −20° C. by using injection moulded test specimens of 80×10×4 mm³ prepared in accordance with EN ISO 19069-2.

k) Heat Deflection Temperature (HDT)

The heat deflection temperature B HDT-B was measured according to ISO 75-2 at 0.45 MPa.

l) Adhesion

Adhesion is characterized as the resistance of the prefabricated scratch template to pressure-water jetting according to DIN 55662 (Method C).

Injection moulded sample plates (150 mm×80 mm×2 mm) were cleaned with Zeller Gmelin Divinol® 1262. Subsequently the surface was activated via flaming where a burner with a speed of 670 mm/s spreads a mixture of propane (9 l/min) and air (180 l/min) in a ratio of 1:20 on the polymer substrate. Afterwards, the polymer substrate was coated with 2 layers, i.e. a base coat (Iridium Silver Metallic 117367) and a clear coat (Carbon Creations® 107062). The step of flaming was performed two times. A steam of hot water with temperature T was directed for time t at distance d under angle α to the surface of the test panel. Pressure of the water jet results from the water flow rate and is determined by the type of nozzle installed at the end of the water pipe.

The following parameters were used:

T (water)=60° C.; t=60 s; d=100 mm, α=90°, water flow rate 11.3 l/min, nozzle type=MPEG 2506.

The adhesion was assessed by quantifying the failed or delaminated painted area per test line. For each example 5 panels (150 mm×80 mm×2 mm) have been tested. The panels were produced by injection moulding with 240° C. melt temperature and 50° C. mold temperature. The flow front velocity was 100 mm/s and 400 mm/s respectively. On each panel certain lines were used to assess the paintability failure in [mm²]. For this purpose, an image of the test point before and after steam jet exposure was taken. Then the delaminated area was calculated with an image processing software. The average failed area for 5 test lines on 5 test specimens (i.e. in total the average of 25 test points) was reported as median failed area.

SD is the standard deviation which is determined according to the following formula:

$$\text{Sample Standard Deviation} = \sqrt{\frac{\sum (x-\bar{x})^2}{(n-1)}}$$

wherein
x are the observed values;
$\bar{x}$ is the mean of the observed values; and
n is the number of observations.

m) Shrinkage

Shrinkage (SH) radial; Shrinkage (SH) tangential were determined on centre gated, injection moulded circular disks (diameter 180 mm, thickness 3 mm, having a flow angle of 355° and a cut out of 5°). Two specimens are moulded applying two different holding pressure times (10 s and 20 s respectively). The melt temperature at the gate is 260° C., and the average flow front velocity in the mould 100 mm/s. Tool temperature: 40° C., back pressure: 600 bar.

After conditioning the specimen at room temperature for 96 hours the dimensional changes radial and tangential to the flow direction are measured for both disks. The average of respective values from both disks are reported as final results.

2. Examples a) Catalyst Preparation

For the preparation of the catalyst 3.4 litre of 2-ethyl-hexanol and 810 ml of propylene glycol butyl monoether (in a molar ratio 4/1) were added to a 20.0 l reactor. Then 7.8 litre of a 20.0% solution in toluene of BEM (butyl ethyl magnesium) provided by Crompton GmbH, were slowly added to the well stirred alcohol mixture. During the addition, the temperature was kept at 10.0° C. After addition, the temperature of the reaction mixture was raised to 60.0° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25.0° C. Mixing speed was adjusted to 170 rpm. 26.0 g of Mg-complex prepared above was added within 30 minutes keeping the temperature at 25.0° C. 3.0 ml of Viscoplex® 1-254 and 1.0 ml of a toluene solution with 2 mg Necadd 447™ was added. Then 24.0 ml of heptane was added to form an emulsion. Mixing was continued for 30 minutes at 25.0° C., after which the reactor temperature was raised to 90.0° C. within 30 minutes. The reaction mixture was stirred for a further 30 minutes at 90.0° C. Afterwards stirring was stopped and the reaction mixture was allowed to settle for 15 minutes at 90.0° C. The solid material was washed 5 times: washings were made at 80.0° C. under stirring for 30 min with 170 rpm. After stirring was stopped the reaction mixture was allowed to settle for 20-30 minutes and followed by siphoning.

Wash 1: washing was made with a mixture of 100 ml of toluene and 1 ml donor

Wash 2: washing was made with a mixture of 30 ml of TiCl4 and 1 ml of donor.

Wash 3: washing was made with 100 ml of toluene.

Wash 4: washing was made with 60 ml of heptane.

Wash 5: washing was made with 60 ml of heptane under 10 minutes stirring.

Afterwards stirring was stopped and the reaction mixture was allowed to settle for 10 minutes while decreasing the temperature to 70° C. with subsequent siphoning, followed by $N_2$ sparging for 20 minutes to yield an air sensitive powder.

b) Polymerization of the Heterophasic Propylene Copolymer HECO

The heterophasic propylene copolymer HECO was produced in a pilot plant with a prepolymerization reactor, one slurry loop reactor and two gas phase reactors. The solid catalyst component described above was used for the HECO along with triethyl-aluminium (TEAL) as co-catalyst and dicyclo pentyl dimethoxy silane (D-donor) as external donor.

The polymerization process conditions, the properties of the propylene polymer fractions and of the polypropylene composition are described in Table 1.

TABLE 1

Polymerization process conditions, properties of the propylene polymer fractions and properties of the heterophasic propylene copolymer HECO

| | | HECO |
|---|---|---|
| Prepolymerization reactor | | |
| Temperature | [° C.] | 21 |
| Catalyst feed | [g/h] | 1.2 |
| D-Donor | [g/t propylene] | 40.3 |
| TEAL/propylene | [g/t propylene] | 180.1 |
| Al/D-Donor [Co/ED] | [mol/mol] | 6.2 |
| Al/Ti [Co/TM] | [mol/mol] | 8.9 |
| $H_2$ feed | [g/h] | 2.5 |
| $C_2$ feed | [g/h] | 0.3 |
| Production rate | [kg/h] | 0.9 |
| Residence Time | [h] | 0.33 |
| Loop reactor (first matrix fraction) | | |
| Temperature | [° C.] | 80 |
| Pressure | [kPa] | 5455 |
| $C_3$ feed | [kg/h] | 157.5 |
| $H_2$ feed | [g/h] | 48.5 |
| $C_2$ feed | [g/h] | 0.1 |
| Residence time | [h] | 0.4 |
| Production rate | [kg/h] | 31.8 |
| Split* | [%] | 62.7 |
| $H_2/C_3$ ratio | [mol/kmol] | 6.4 |
| $C_2/C_3$ ratio | [mol/kmol] | 0.8 |
| $MFR_2$ | [g/10 min] | 42 |
| $C_2$ content | [wt %] | 0.2 |
| XCS | [wt %] | 1.9 |
| First gas phase reactor (second matrix fraction) | | |
| Temperature | [° C.] | 80 |
| Pressure | [kPa] | 2600 |
| $C_3$ feed | [kg/h] | 206.0 |
| $H_2$ feed | [g/h] | 577 |
| $C_2$ feed | [g/h] | 0 |
| Residence time | [h] | 2.7 |
| Split* | [%] | 37.3 |
| $H_2/C_3$ ratio | [mol/kmol] | 69.3 |
| $C_2/C_3$ ratio | [mol/kmol] | 0.3 |
| $C_2$ content | [wt %] | 0.1 |
| $MFR_2$ | [g/10 min] | 41.8 |
| XCS | [wt %] | 1.5 |
| Second gas phase reactor (elastomeric fraction) | | |
| Temperature | [° C.] | 80 |
| Pressure | [kPa] | 2593 |
| $C_3$ feed | [kg/h] | 80 |
| $H_2$ feed | [g/h] | 61 |
| $C_2$ feed | [g/h] | 17 |
| Residence time | [h] | 1.6 |
| Split* | [%] | 27 |
| $H_2/C_3$ ratio | [mol/kmol] | 84 |
| $C_2/C_3$ ratio | [mol/kmol] | 399 |
| Final properties | | |
| $MFR_2$ | [g/10 min] | 17.0 |
| Total $C_2$ content | [wt %] | 8.1 |
| XCS | [wt %] | 25.4 |
| $C_2$ content (XCS phase) | [wt %] | 44.7 |
| iV (XCS phase) | [dg/l] | 3.66 |

* Split relates to the amount of propylene polymer produced in each specific reactor.

c) Polymerization of the Random Propylene/Ethylene/1-Butene Terpolymer (C3C2C4)

The random propylene/ethylene/1-butene terpolymer (C3C2C4) was produced in a loop process known as classical Spheripol process with a prepolymerization reactor and one slurry loop reactor. As catalyst commercially available catalyst Avant ZN180M by Lyondell Basell along with cyclohexylmethyl dimethoxy silane (C-Donor) as donor were used.

The polymerization process conditions, the properties of the propylene polymer fractions and of the polypropylene composition are described in Table 2.

TABLE 2

Polymerization process conditions, properties of the propylene polymer fractions and properties of the random propylene/ethylene/1-butene terpolymer (C3C2C4)

| | | C3C2C4 |
|---|---|---|
| Prepolymerization reactor | | |
| Temperature | [° C.] | 20 |
| Pressure | [kPa] | 5500 |
| Al/Donor [Co/ED] | [mol/mol] | 10 |
| Al/Ti [Co/TM] | [mol/mol] | 150 |
| Residence Time | [min] | 20 |
| Loop reactor | | |
| Temperature | [° C.] | 63 |
| Pressure | [kPa] | 5500 |
| $H_2/C_3$ ratio | [mol/kmol] | 0.6 |
| $C_2/C_3$ ratio | [mol/kmol] | 14.5 |
| $C_4/C_3$ ratio | [mol/kmol] | 228.9 |
| Residence time | [h] | 0.5 |
| Final properties | | |
| $MFR_2$ | [g/10 min] | 1.7 |
| $C_2$ content | [wt %] | 1.4 |
| $C_4$ content | [wt %] | 7.1 |
| XCS | [wt %] | 10.8 |
| Tm | [° C.] | 134 |
| Tc | ° C. | 109 | d) Further Components

The following components were also used for the preparation of the polypropylene based compositions of the examples:

Random propylene ethylene copolymer (C3C2) with an content of ethylene comonomer units of 4.7 wt % and a $MFR_2$ of about 2 g/10 min, commercially available from Borealis AG as RB801CF. The copolymer has an XCS content of 8.5 wt %, a Tm of 138° C. and a Tc of 96° C.

Low density polyethylene (LDPE) with a density of 918 kg/m³ and a $MFR_2$ of 7.5 g/10 min, commercially available from Borealis AG as MA8200

Plastomer being an ethylene/1-octene copolymer with a density of 882 kg/m³ and a $MFR_2$ (measured at 190° C.) of 1.1 g/10 min, commercially available from Borealis AG as Queo 8201. The copolymer has a weight average molecular weight of 125 kg/mol, a molecular weight distribution Mw/Mn of 2.5, a Tm of 72° C. and a Tc of 56° C.

Talc with a median particle size of 1.2 µm and a BET surface area of 14.5 m²/g, commercially available from Imerys as Jetfine 3CA HC001 is the commercial unimodal propylene homopolymer HC001A-B1 of Borealis AG having a melt flow rate $MFR_2$ (230° C.) of about 2 g/10 min and a Tm of 160° C.

Carbon Black Masterbatch (CB-MB) is the commercial carbon black masterbatch "Plasblak PE4103" of Cabot Corporation, Germany.

Antioxidant (AO) is Octadecyl 3-(3',5'-di-tert. butyl-4-hydroxyphenyl)propionate (CAS No. 2082-79-3) commercially available as Irganox 1076 FD from BASF AG, Germany.

e) Polypropylene Based Compositions

The polypropylene based compositions were prepared by mixing in a co-rotating twin-screw extruder ZSK18 from Coperion with a typical screw configuration and a melt temperature in the range of 200-220° C. The melt strands were solidified in a water bath followed by strand pelletization.

The compositions and the properties of the polypropylene based compositions are described in Table 3.

TABLE 3

Polypropylene based compositions, properties

| | | IE1 | CE1 | CE2 | CE3 |
|---|---|---|---|---|---|
| HECO | [wt %] | 56.7 | 66.7 | 56.7 | 66.7 |
| C3C2C4 | [wt %] | 8.0 | — | — | — |
| C3C2 | [wt %] | — | — | 8.0 | — |
| LDPE | [wt %] | — | — | — | 5.0 |
| Plastomer | [wt %] | 18.0 | 16.0 | 18.0 | 11.0 |
| Talc | [wt %] | 15.0 | 15.0 | 15.0 | 15.0 |
| HC001 | [wt %] | 1.45 | 1.45 | 1.45 | 1.45 |
| CB-MB | [wt %] | 0.8 | 0.8 | 0.8 | 0.8 |
| AO | [wt %] | 0.05 | 0.05 | 0.05 | 0.05 |
| Properties | | | | | |
| $MFR_2$ | [g/10 min] | 8.0 | 9.2 | 8.1 | 9.8 |
| Flexural modulus | [MPa] | 1647 | 1898 | 1693 | 1864 |
| Charpy NIS, 23° C. | [kJ/m²] | 69 | 61 | 70 | 51 |
| Charpy NIS, −20° C. | [kJ/m²] | 7 | 7 | 7 | 6 |
| HDT B | [° C.] | 96 | 104 | 100 | 105 |
| Radial shrinkage | [%] | 0.73 | 0.79 | 0.73 | 0.83 |
| Paint adhesion failure | [mm²] | 18 | 39 | 34 | 90 |

The invention claimed is:

1. A polypropylene based composition comprising:
   (A) from 40.0 to 85.0 wt % of a heterophasic propylene copolymer having a content of xylene cold soluble (XCS) fraction in the range of 15 wt % to 35 wt %, based on the total weight of the heterophasic propylene copolymer;
   (B) from 5.0 to 15.0 wt % of a terpolymer of propylene with ethylene and 1-butene comonomer units having a melting temperature Tm as measured in differential scanning calorimetry (DSC) of less than 140° C.;
   (C) from 5.0 to 25.0 wt % of an ethylene copolymer with alpha-olefin comonomer units having from 4 to 12 carbon atoms with a density of from 850 kg/m³ to 900 kg/m³; and
   (D) from 5.0 to 25.0 wt % of an inorganic filler,
   wherein the amounts of components (A), (B), (C), and (D) are all based on the total weight amount of the polypropylene based composition,
   said polypropylene based composition having a melt flow rate ($MFR_2$) as measured at 230° C. and 2.16 kg load in accordance with ISO 1133 in the range of 2.0 g/10 min to 20 g/10 min.

2. The polypropylene based composition according to claim 1, wherein the xylene cold solubles (XCS) phase of the heterophasic propylene copolymer (A) has a comonomer content of from 25 to 55 wt %, based on the total weight of the xylene cold solubles (XCS) phase of the heterophasic propylene copolymer (A).

3. The polypropylene based composition according to claim 1, wherein the heterophasic propylene copolymer (A) has a matrix phase and an elasteomeric phase dispersed therein and the matrix phase is a random copolymer of propylene and comonomer units selected from ethylene and alpha olefins having from 4 to 12 carbon atoms in an amount of from 0.01 wt % to 1.5 wt %, based on the weight total amount of the matrix phase of the heterophasic propylene copolymer (A).

4. The polypropylene based composition according to claim 1, wherein the terpolymer of propylene with ethylene and 1-butene comonomer units (B) has a melt flow rate MFR (190° C., 2.16 kg) of from 1.0 g/10 min to 50.0 g/10 min.

5. The polypropylene based composition according to claim 1, wherein the terpolymer of propylene with ethylene and 1-butene comonomer units (B) has a content of ethylene comonomer units of from 0.5 wt % to 3.5 wt % and a content of 1-butene comonomer units of from 5.0 wt % to 10.0 wt %, both based on the total amount of the terpolymer of propylene with ethylene and 1-butene comonomer units (B).

6. The polypropylene based composition according to claim 1, wherein the terpolymer of propylene with ethylene and 1-butene comonomer units (B) has an amount of a xylene cold soluble (XCS) fraction of from 3.0 wt % to 20.0 wt %, based on the total weight of the terpolymer of propylene with ethylene and 1-butene comonomer units (B).

7. The polypropylene based composition according to claim 1, wherein the terpolymer of propylene with ethylene and 1-butene comonomer units (B) has a crystallisation temperature Tc of from 90° C. to 120° C.

8. The polypropylene based composition according to claim 1, wherein the ethylene copolymer with alpha-olefin comonomer units (C) is an ethylene based plastomer with comonomer units selected from alpha-olefins having from 4 to 12 carbon atoms.

9. The polypropylene based composition according to claim 1, wherein the inorganic filler (D) is selected from the group consisting of talc, wollastonite, caolin and mica.

10. The polypropylene based composition according to claim 1 having a Charpy notched impact strength at 23° C. of at least 50 kJ/m$^2$ and/or a Charpy notched impact strength at −20° C. of at least 5.0 kJ/m$^2$.

11. The polypropylene based composition according to any claim 1 having a flexural modulus of at least 1300 MPa.

12. A painted article comprising the polypropylene based composition according to claim 1.

13. The article according to claim 12 having a shrinkage of less than 1.0%.

14. The article according to claim 12 having a paint adhesion failure as average delaminated area of from 10.0 mm$^2$ to 50 mm$^2$.

\* \* \* \* \*

UNITED STATES PATENT AND TRADEMARK OFFICE
CERTIFICATE OF CORRECTION

| | | |
|---|---|---|
| PATENT NO. | : 11,643,537 B2 | |
| APPLICATION NO. | : 17/269217 | |
| DATED | : May 9, 2023 | |
| INVENTOR(S) | : Wang et al. | |

It is certified that error appears in the above-identified patent and that said Letters Patent is hereby corrected as shown below:

On the Title Page

Item (54) and in the Specification, Column 1, Lines 1 and 2, Reads:
"POLYPROPYLENE BASED COMPOSITION WITH IMPROVED PAINT ABILITY"
Should read:
--POLYPROPYLENE BASED COMPOSITION WITH IMPROVED PAINTABILITY--

In the Claims

Column 38, Claim 11, Line 12:
Delete the word "any"

Signed and Sealed this
Eleventh Day of July, 2023

Katherine Kelly Vidal
*Director of the United States Patent and Trademark Office*